United States Patent [19]

Hirosawa et al.

[11] Patent Number: 5,237,677
[45] Date of Patent: Aug. 17, 1993

[54] MONITORING AND CONTROLLING SYSTEM AND METHOD FOR DATA PROCESSING SYSTEM

[75] Inventors: Toshio Hirosawa, Machida; Jun'ichi Kurihara, Matsuyama; Ikuo Kimura, Yamato; Hideki Nanba, Hadano, all of Japan

[73] Assignees: Hitachi, Ltd.; Hitachi Electronics Services Co., Ltd., Tokyo, Japan

[21] Appl. No.: 613,384

[22] Filed: Nov. 6, 1990

[30] Foreign Application Priority Data

Nov. 8, 1989 [JP] Japan .................................. 1-288917

[51] Int. Cl.[5] ............................................ G06F 11/00
[52] U.S. Cl. .................................. 395/575; 371/16.5; 371/29.1
[58] Field of Search .............. 395/575; 371/16.1, 16.5, 371/29.1

[56] References Cited

U.S. PATENT DOCUMENTS

| 4,204,249 | 5/1980 | Dye et al. | |
| 4,984,239 | 1/1991 | Suzuki et al. | 371/16.1 |
| 5,067,129 | 11/1991 | Evans et al. | 371/16.1 |
| 5,119,377 | 6/1992 | Cobb et al. | 371/16.1 |

FOREIGN PATENT DOCUMENTS 58-56158 4/1983 Japan .
61-148542 7/1986 Japan .

Primary Examiner—Vincent P. Canney
Attorney, Agent, or Firm—Fay, Sharpe, Beall, Fagan, Minnich & McKee

[57] ABSTRACT

Fault monitoring/controlling apparatus and method for a data processing system comprises one or more computer systems, monitor and control apparatuses connected thereto for monitoring and controlling the associated computer systems and a single supervision/control system provided at a site remote from the computer systems. When abnormality taking place in the computer system is decided as a fault, report of the fault occurrence is automatically effectuated to the remotely located supervision/control system, which responds to the reception of the fault report and issues, if necessary, a command requesting additional supply of detailed fault information to the computer system suffering the fault. The additional fault information is comparatively collated with the fault information accumulated (precedents). When a reference precedent which coincides with the fault occurring currently is found to be present as the result of collation, a recovery procedure is generated on the basis of the precedent data to be subsequently transmitted to the computer system of concern. A plurality of computer systems can be monitored in a consolidated manner, wherein fault taking place in the computer systems can be removed rapidly through diagnosis and execution of appropriate procedure.

57 Claims, 22 Drawing Sheets

| DIAGNOSIS NUMBER | VALUE OF AD | VALUE OF DT | ADDITIONAL INFORMATION | REMARKS |
|---|---|---|---|---|
| 0 | 5 | START ADDRESS | BYTE NUMBER | HARDWARE REGION |
| 1 | 5 | START ADDRESS | BYTE NUMBER | OS CONTROL TABLE |
| 2 | 2 | PSW-ID | | PSW |
| 2 | 4 | PXR | | PREFIX |
| 3 | 2 | LATCH-ID | | EU |
| 4 | 1 | LATCH-ID | | IU |
| 5 | 3 | LATCH-ID | | IOP |
| 6 | 5 | START ADDRESS | BYTE NUMBER | LOG-OUT |

FIG. 8

LCOMT

| ORDER | COMMAND NAME | CONTENTS |
|---|---|---|
| 1 | GETMSG | OBTAINING CONTENTS OF MESSAGE BUFFER |
| 2 | GETHARD ΔH / OS | (1) OBTAINING INFORMATION OF AREA USED BY HARDWARE<br>(2) OBTAINING OS CONTROL TABLE OF MAIN STORAGE |
| 3 | GETLOG Δn | OBTAINING HARDWARE LOG. n REPRESENTS THE NUMBER OF FLAG BIT SHOWN IN FIG. 4 |
| 4 | ACTION | OBTAINING FAULT RECOVERY PROCEDURE |
| 5 | RCOVER | REGISTRATION OF SUCCESSFUL RECOVERY PROCEDURE |
| 6 | SUMMARY | OBTAINING OUTLINE OF FAULT |
| 7 | TRANSFER Δ<br>   MSG<br>   HARD<br>   LOG | TRANSFER OF FAULT INFORMATION<br>   MESSAGE<br>   MAIN MEMORY<br>   LOG-OUT |
| 8 | DISPLAY Δ<br>   MSG<br>   HARD<br>   LOG | DISPLAY OF FAULT INFORMATION<br>   MESSAGE<br>   MAIN MEMORY<br>   LOG-OUT |

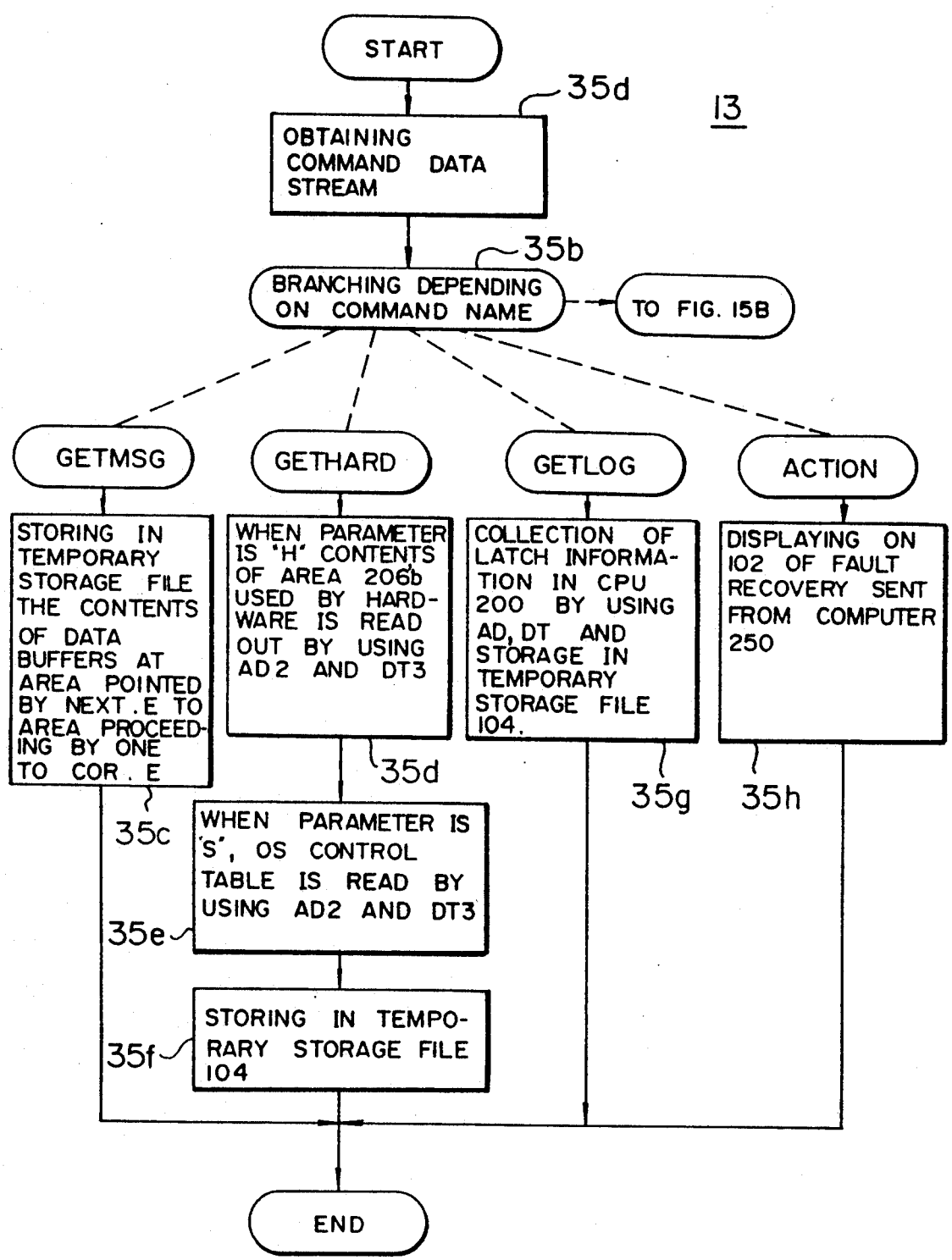

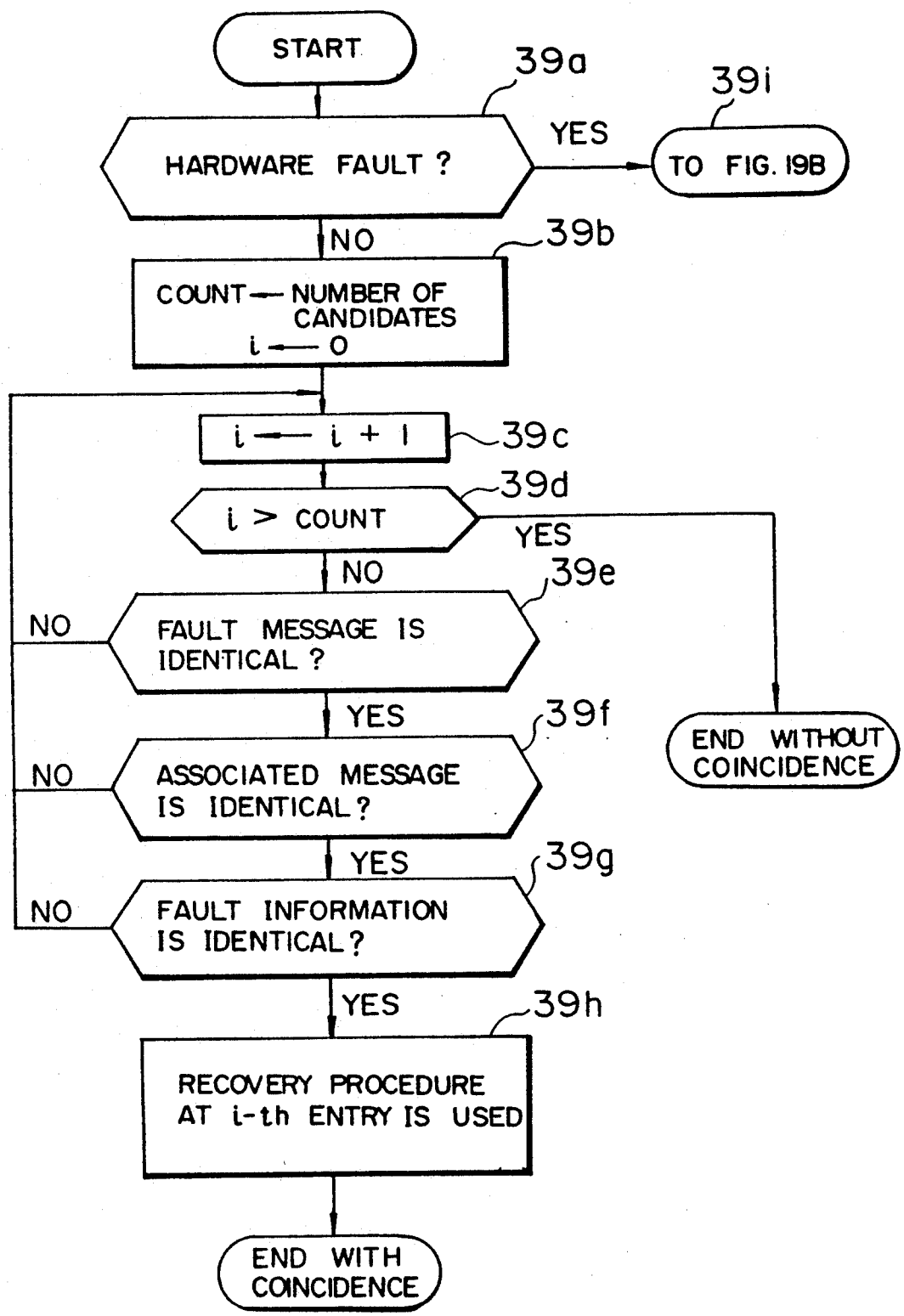

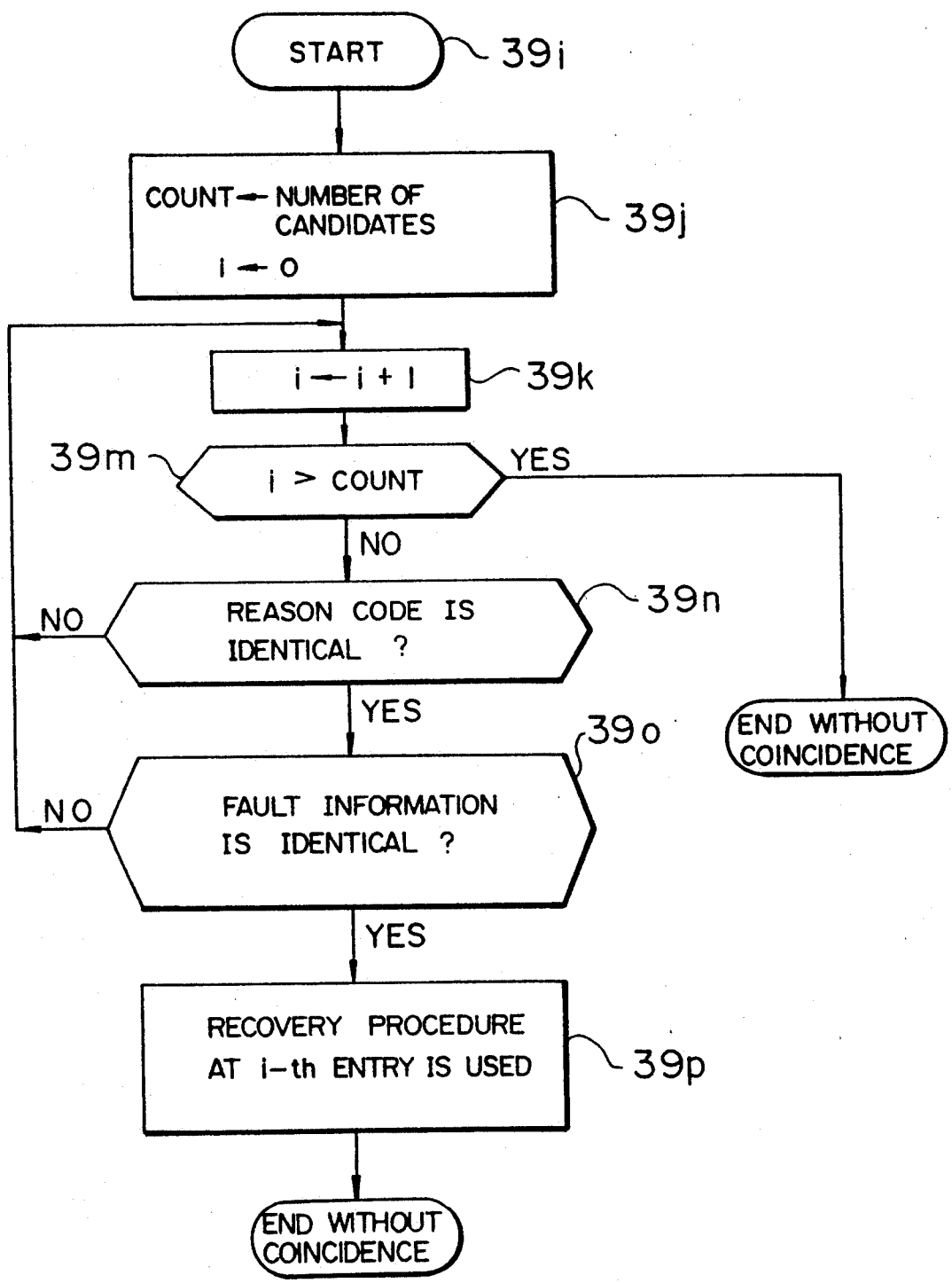

MONITORING AND CONTROLLING SYSTEM AND METHOD FOR DATA PROCESSING SYSTEM

BACKGROUND OF THE INVENTION

The present invention relates generally to a fault monitoring system and a method of controlling the same for a data processing system or systems. More particularly, the present invention is concerned with a Control system which is profitably and advantageously suited for carrying out rapidly an initial diagnosis and effectuating recovery command from a remotely located place or station when some fault occurs in the data processing system (hereinafter also referred to as computer system).

As the range of applications of data processing systems or electronic computer systems increases, the system structurization tends to be of larger and large scale with correspondingly increased complexity. Under the circumstance, great importance is put on the improvement of reliability, enhanced fault tolerancy (fault withstanding capability), rapid restoration of the system after occurrence of a fault and others.

In the data processing systems developed in recent years, there exists a general tendency that the main body of a data processing system or computer system is additionally equipped with a maintenance and control-dedicated apparatus for performing maintenance and diagnosis of the computer system. This type of control apparatus is known as a service processor (SVP in abbreviation), a typical one of which is disclosed in U.S Pat. No. 4,204,249. Besides, in JP-A-58-56158, there is disclosed a control system in which a plurality of user computer systems are subjected to maintenance and diagnosis performed by a Computer system installed at a maintenance center located remotely. Additionally, there is disclosed in JP-A-61-148542 a control system capable of manipulating a display of the SVP from a remotely located place.

According to the technique disclosed in U.S. Pat. No. 4,204,249, a concentrated management for a plurality of processors is made possible by imparting a power on/-off control and a microprogram loading control to the SVP. It is noted above all that by wiring the dedicated signal lines extending directly from the control apparatus to a group of processors, there is required a smaller number of wirings when compared with the parallel wiring system known heretofore.

According to the technique disclosed in JP-A-58-56158, a computer system installed at a maintenance center monitors constantly a plurality of user's computer systems sequentially for the purpose of detecting in advance the occurrence of faults or obstacles. Further, there is disclosed in JP-A-61-1485542 a system in which a display of a service processor or SVP can be manipulated from a remote place by using at the maintenance site a display control program of a same structure as that of a display control program in the SVP and substantially same processing procedure. To this end, a data buffer is provided in the SVP and the content of this data buffer is transferred to the maintenance site.

As the full-time (24-hour) operation service of the data processing system is increasingly adopted with the fields of applications thereof being widened, there are required not only development of techniques for improving and enhancing the reliability and fault tolerancy of the data processing system but also such control means which can ensure rapid recovery of the system after occurrence of the fault. The rapid recovery may be accomplished when a maintenance engineer resides all the time at the site of the user's computer system. However, as the 24-hour operation service spreads and unattended operation comes into general use, it becomes necessary that the system maintenance engineers are standing ready at the maintenance center for performing the fault monitor and maintenance for a plurality of user's computer systems. To this end, the function for detecting occurrence of a fault in the user's computer system from a remote place has to be filled up while providing control means for the rapid recovery.

When the prior art techniques are viewed in the light of the above, the technique disclosed in U.S. Pat. No. 4,204,249 permits arbitrary adjustment of electric power supply unit and facilitated alteration of wirings as the computer system structure becomes complicated. More specifically, the power-on/off and voltage regulation can be performed by the SVP. However, this patent teaches neither the fault monitoring or maintenance method from a remote place. Further, the system disclosed in this patent is imposed with a constraint that a group of processors constituting a data processing system have to be supervised by the SVP installed at the system site.

According to the technique disclosed in JP-A-58-56158, a computer system installed at a maintenance center is adapted to perform communication with the SVP of user's computer systems installed at different sites for monitoring then cyclically with a view to enhancing the availability of the maintenance center computer system while trying automation of diagnosis by cataloging the monitoring procedure. However, there are not disclosed in concrete in JP-A-58-56158 any fault detecting means, practical items of logging information, the standards or reference information for the fault decision and others.

On the other hand, according to the technique disclosed in JP-A-61-148542, the SVP of the computer system at the user's site is provided with a data buffer for the purpose of generating on a remote display unit a same display as that generated by the SVP of the computer system installed at the site, so that the content of the data buffer can be displayed on the SVP display of the user's computer system and the remotely located display device, whereby logical structure of processing programs are simplified. By virtue of such arrangement, it is possible to manipulate the SVP of the user's computer system with the aid of the display device installed at a remote maintenance center. At his juncture, it is noted that the SVP is intrinsically designed for backing up the maintenance operation and capable of detecting a fault so far as it occurs in hardware. However, detection of erroneous operation of software, i.e. operating system or OS is in general difficult or impossible. Usually, when an OS is running, the fault detection is mainly carried out by monitoring OS-oriented console messages and the like. However in JP-A-61-148542, no consideration is made as to the timing for changing-over the SVP displays at the user site and the remote location, the console message detecting means, method of reporting occurrence of fault, items of fault information to be collected from the SVP display information, and the collecting method.

In order to realize the detection of a fault occurring in the user's computer system and rapid recovery of the system after occurrence of fault at a maintenance center or the like place, there remains as a problem to be solved a method how to realize a mechanism which is capable of collecting instantly the process of behavior of the computer systems of concern at a remote place. In general, history of the behavior of the OS can be acquired by tracing the messages which have been outputted on the OS console. Usually, the hard copy device for outputting the console messages is located near the user's computer system. However, when that computer system is operated in a so-called unattended mode, the power supply for the hard copy device is turned off in most cases in order to evade such undesirable situation as exhaustion of copy paper and jamming thereof.

Further, for disposing of the fault, particular areas in a main storage have to be referred from a remote place. As such areas, there may be mentioned an area where OS managing information is stored and an area used by hardware.

Needless to say, when a user's computer system is operated in the unattended mode, there are present at the system neither operator nor maintenance engineer. Accordingly, there exists a demand for provision of control means for detecting the occurrence of faults. Further, when occurrence of a fault or obstacle is recognized at a remote station, it is necessary to perform initial analysis until the time point when a maintenance engineer has arrived at the site of the computer system suffering from the fault. Provision of the control means mentioned above can naturally contribute to rapid recovery of the computer system after the occurrence of a fault.

SUMMARY OF THE INVENTION

An object of the present invention is to provide monitoring and controlling system and method for a data processing system which are capable of monitoring occurrence of fault in computer systems constituting the data processing system and ensuring rapid recovery from the fault suffering state at a remote place or station.

Another object of the present invention is to provide a system in which a supervision and control center can collect sequentially information of fault occurring in any of plural computer systems through fault monitor and control apparatuses provided in association with the computer systems, respectively.

Still another object of the present invention is to provide a system in which lots of fault information collected are stored and accumulated at the supervision/control center as fault records (also referred to as precedent case information) for enhancing the learning function in the analysis of faults so that the precedent case information can provide materials or data useful in analyzing a fault occurring in the future.

Yet another object of the present invention is to provide a system in which fault information sent out from the fault monitor/control apparatus is collated with the precedent case or record information.

A further object of the present invention is to teach a system and a method for generating standardized fault remedying or recovering procedure on the basis of the results of the collation.

In view of the above and other objects which will become more apparent as description proceeds, there are provided according to the present invention such systems and methods as described below.

Monitoring and controlling system and method for a data processing system in which occurrence of some fault or obstacle in respect to software or hardware of computer systems to be monitored is detected by an associated monitor/control apparatus, which then reports automatically the occurrence of fault to a remotely located supervision and control system serving as a monitoring and controlling center.

Monitoring and controlling system and method for a data processing system in which when occurrence of some fault in software or hardware of any one of plural computer systems to be monitored is detected by the associated monitor/control apparatus, the relevant fault information is stored, and the stored fault information is transmitted to the remotely located supervision/control system serving as the monitoring and controlling center in response to a command issued by the latter.

Monitoring and controlling system and method for a data processing system in which fault information received by the remotely located supervision/control system serving as the monitoring and controlling center is stored as one precedent (standardized history data or record), wherein fault information received newly is collated with a number of standardized records for finding out the record or precedent case which is same as the fault newly received, and if the same precedent exists, a standardized recovery processing procedure for removing the fault is generated on the basis of the result of the collation.

Monitoring and controlling system and method for a data processing system in which fault information received by the remotely located supervision/control system serving as the monitoring and controlling center is stored as one precedent information (standardized history or record), wherein fault information received newly is collated with a number of standardized records for finding out the record or precedent case which is same as the fault newly received, and unless the same precedent exists, the fault information is stored as the material or data to be utilized for the fault analysis in the future.

In the fault monitoring and controlling system and method according to the present invention, the monitor/control apparatuses associated with the computer systems to be monitored relay and monitor the message data to a master console known heretofore. In conjunction with a hardware fault detecting method, there is provided a dedicated interface line for the center processing unit for the purpose of detecting the occurrence of a fault or obstacle and collecting the fault information. Accordingly, there arises no need for modifying the operating system used heretofore without incurring any erroneous operation.

BRIEF DESCRIPTION OF THE DRAWINGS

FIG. 8 is a view showing a format for a command issued from consoles (102) and (252) or for a command issued to the monitor/control apparatus (100) from the supervision/maintenance-dedicated computer system (250);

FIGS. 15A and 15B are flow charts for illustrating a processing executed by a command interpretation processing part (13) incorporated in the monitor/control apparatus (100);

FIGS. 19A and 19B are flow charts for illustrating a processing executed by a collation processing part (25);

DESCRIPTION OF THE PREFERRED EMBODIMENTS

Now, the present invention will be described in detail in conjunction with a preferred or exemplary embodiment thereof by reference to FIGS. 1 to 22.

Figure 1:
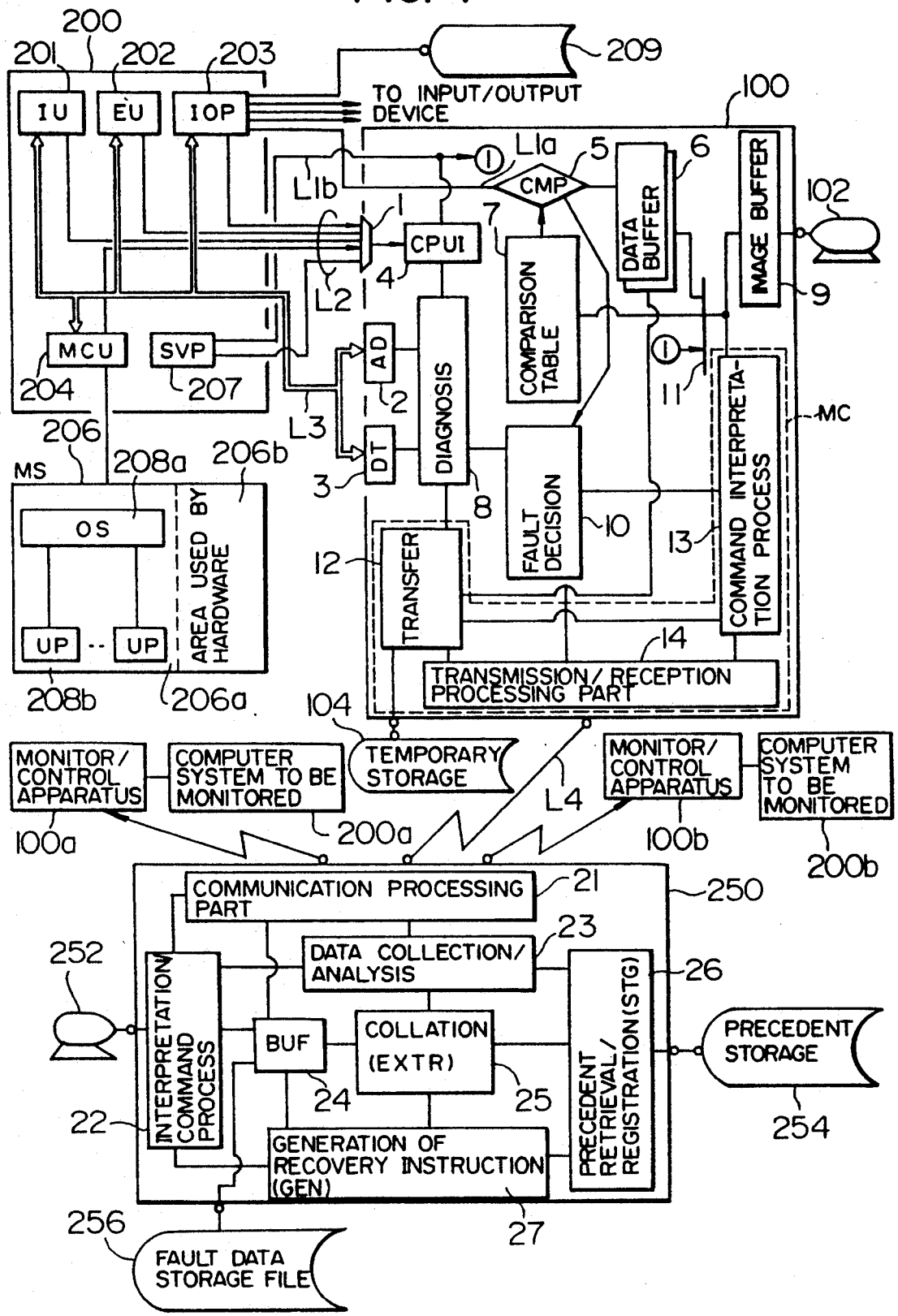
FIG. 1 is a diagram showing a general arrangement of a fault monitoring system for a data processing system and illustrating a control method according to an embodiment of the present invention.

FIG. 1 is a view showing schematically a general arrangement of a fault or obstacle monitoring system for monitoring a data processing system as to occurrence of a fault (failure) or obstacle and performing corresponding control operations according to an embodiment of the invention. In the figure, a reference numeral 200 denotes a computer system which is to be monitored or supervised and on which an operating system or OS 208a and a user program or UP 208b are running. Typical processing hardware parts constituting the computer system 200 include an instruction unit or IU 201, an execution unit or EU 202, an input/output (I/O) processing unit or IOP 203, a memory control unit or MCU 204, a main storage or MS 206 and a service processor or SVP 207. Further, the computer system 200 is equipped with input/output units such as a file unit 209 and others.

A reference numeral 100 denotes a monitor/control apparatus which constitutes at least one part of the fault monitoring system according to the invention. The computer system 200 of concern is connected to the monitor/control apparatus 100 via a signal line L1a for a system console and a display signal line L1b of the service processor (SVP) 207. Parenthetically, it should be mentioned that the system console signal line L1a and the display signal line L1b of the SVP 207 may be implemented as one and the same signal line. In this case, however, the signal line L1a is led out from the I/O processing unit 203 via the SVP 207.

Further, the monitor/control apparatus 100 according to the invention and the computer system 200 are interconnected through request signal lines L2 outgoing from the individual processing units mentioned above and a signal line 13 which represents an address bus and a data busy respectively. Although the address bus and the data bus are represented by one and the same signal line L3, this is only for convenience of illustration. It goes without saying that they are constituted by separate signal lines, respectively.

The monitor/control apparatus 100 is composed of a processor imparted with processing capability equivalent to that of a microprocessor or the like, a main memory or storage and a group of processing programs. In conjunction with the monitor control apparatus 100 shown in FIG. 1, a reference numeral 1 denotes an encoder, 2 denotes an address register or AD in abbreviation, and 3 denotes a data register or DR. Further, a reference numeral 4 denotes a CPU interface processing part (CPU interface), 5 denotes a comparison processing part (CMP), 6 denotes a data buffer, 7 denotes a table for comparison, 7 denotes a diagnosis processing part, 9 denotes an display buffer, 10 denotes a fault decision processing part, 11 denotes a distributor, 12 denotes a transfer processing part, 13 denotes a command interpretation processing part, and a reference numeral 14 denotes a reception/transmission processing part. There are connected to the monitor/control apparatus 100 a display unit 102 equipped with a keyboard and a file 104 serving as a temporary storage.

The monitor/control apparatus 100 is connected to a remotely located supervision/maintenance-dedicated computer system 250 by a line L4. Needless to say, public data network may intervene between the monitor/control apparatus and the remotely located supervision maintenance-dedicated computer system 250. There are connected to the computer system 250 a console unit 252 for controlling the supervision/maintenance-dedicated computer system 250, a file unit 254 for storing precedent case data, and a fault or obstacle data storage file 256. Obviously, a group of input/output units such as line printers and the like devices or units may be connected to the computer system 250 although they are not shown in FIG. 1.

A variety of programs for analyzing fault factors or causes can run on the supervision/maintenance-dedicated computer system 250. To this end, there are provided a communication processing part denoted by a reference numeral 21, an interpretation/command processing part denoted by 22, a data collection/analyzation processing part 23, and a precedent case retrieval/registration processing part denoted by a numeral 26. A reference numeral 24 denotes a work buffer or BUF in abbreviation.

The supervision/maintenance-dedicated computer 250 is capable of supervising or managing a plurality of computer systems to be monitored. Reference numerals 100a and 100b denote, respectively, other monitor/control apparatuses which are similar to the monitor/control apparatus 100. Further, reference symbols 200a and 200b denote, respectively, computer systems to be monitored.

The major aspects or features characterizing the present invention may be summarized as follows:

When fault information taking place in any one of computer systems being monitored by the associated monitor/control apparatus provided in associated with that one computer system is decided to be a software or hardware fault, corresponding information can be automatically and instantly reported to the remotely located supervision/control system serving as the monitoring center.

Detailed information for the fault decided as mentioned above is previously stored in storage means (first storage means). By virtue or such arrangement, when the remotely located fault supervision/control system issues at a later time point a command requesting further detailed information than the reported content mentioned above, the monitor/control apparatus associated with the computer system suffering from the fault can instantly send out the information as requested.

When data is sent out from the monitor/control apparatus mentioned above to the remotely located supervision/control system, all the data is not sent out but 16 the data to be transferred undergoes a data amount reducing processing. Thus, the time taken for the data sending or transfer can be shortened.

The remotely located supervision control system serving as the monitoring center collects, stores and accumulates as the standardized fault records (precedents) the fault information received from the monitor/control apparatuses provided in association with the computer systems to be monitored, respectively, wherein when fault information is newly received, collation is performed for deciding whether or not the same record or precedent as the newly received fault exists in the accumulated information. When it exists, a standardized recovery processing procedure for remedying or removing the fault is generated.

The remotely located supervision/control system serving as the monitoring center collects, stores and accumulates as the standardized fault records (precedents) the fault information received from the monitor/control apparatuses provided in association with the computer systems to be monitored, respectively, wherein when fault information is newly received, collation is performed for deciding whether or not the same record or precedent as the newly received fault exists in the accumulated information. Unless it exists, the newly received fault information is stored as the material or data to be utilized for collation in the future, whereby learning effect is enhanced.

Now, operations of the fault monitor apparatus for the data processing system according to the invention as well as a control method therefor will be described briefly by reference to FIG. 1 before entering into detailed description of the individual processing parts which will be made by reference to FIGS. 1 et seq.

Referring to FIG. 1, message data of the operating system or OS 208a are sequentially sent out via the line L1a from the computer system 100 to be monitored/controlled. These message data are sequentially stored in the data buffer 6. When the data buffer 6 becomes full, the storage of the message data is effected, starting again from the first position in the buffer 6. It should however be noted that before the message data are stored in the data buffer 6, check is performed by the comparison processing part CMP 5 for deciding whether or not the message data mentioned above are identical with message data for the fault decision which are previously stored in the comparison table 7. When the comparison check results in coincidence, the control is transferred to the fault decision processing part 10.

When a fault is of software, the fault decision processing part 10 then activates the diagnosis processing part 8 for obtaining additional information about hardware to thereby collect the status information or data of the individual processing units incorporated in the control processing unit 200. Upon collection of the status information, address values of the processing units are loaded in the address register (AD) 2, while identification numbers of items for which the status data are to be collected are placed in the data register (DT) 3, whereon the addresses and the item numbers are send out to the individual processing units incorporated in the control processing unit 100. The individual processing units then return the information or data corresponding to the item numbers via the data bus L3. The status information thus collected is stored once in the temporary storage file 104. As the status data or information of hardware, there may be mentioned the contents stored in the areas 106b of the main storage 206 used by hardware, status hold information in the individual processing units such as that of interrupt hold register, program status word and the like.

On the other hand, a fault of hardware is generally detected by the service processor (SVP) 207 and messaged to the encoder 1 via the line L2. Further, the fault of a type which can not be detected by the service processor (SVP) 207 such as parity error of a latch circuit of the like is messaged to the encoder 1 directly from the individual processing units via the line L2. Upon reception of the hardware fault message, the CPU interface processing part 4 activates the diagnosis processing part 8 to collect the status information of the individual processing units 10 of the central processing unit 200. Thereafter, control is transferred to the fault decision processing part 10. At this juncture, it is to be noted that for the fault of hardware, any further especial processing is not performed because the history of the message data issued from the OS have already been stored in the data buffer 6.

Upon completion of the processings described above, the fault decision processing part 10 dispatches a fault occurrence report to the supervision/maintenance-dedicated computer system 250 by way of the transmission/reception processing part 14 and via the line L4. This information dispatch processing may be carried out in precedence to the collection of the fault information or data. The processing parts 21 to 27 in this computer system represent different portions of a processing program. Upon reception of the fault occurrence report, the supervision/maintenance-dedicated computer system 250 examines globally the fault and issues thereafter request or demand for detailed fault information to the monitor/control apparatus 100. To this end, a data stream representative of the corresponding command is sent to the monitor/control apparatus 100 via the line L4. This command is effectuated by the interpretation/command processing part 22.

In the monitor/control apparatus 100, this command is interpretted by the command interpretation processing part 13 to thereby activate the transfer processing part 12. In that case, the transfer processing part 12 transfers the content of the data buffer 6 and the fault information or data stored in the temporary storage file 104. At that time, the transfer processing part 12 transfers only the information as demanded. However, concerning the data in the area 206b used by hardware in particular, an edition processing is performed with a view to reducing the amount of data to be transferred. In such edition processing, a succession of identical data may be replaced by a corresponding mark, by may of example. In the figure, MC designates a microcomputer, and blocks 12, 13 and 14 represent differents portions of a microcomputer program.

Upon reception of the fault occurrence report from the monitor/control apparatus 100, the interprettion/command processing part 22 issues automatically the abovementioned command, i.e. the fault information transfer command. It should however be mentioned that the relevant command may manually be inputted from the console device 252. In that case, the input command is interpritted by the interpretation/command processing part 22 and thereafter transferred to the command interpretation processing part 13 incorporated in the monitor/control apparatus 100 through the medium of the communication processing part 21. On the side of the supervision/maintenance-dedicated computer system 250, the detailed fault information as transferred thereto is once stored in the fault information storage file 256 by way of the work buffer (BUF) 24.

The collection/analyzation processing part 23 then activates the precedent retrieval/registration processing part 26 to search the precedent storage file 25 for the precedent fault similar to the current fault. Subsequently, the precedent coinciding with the fault of concern is determined by the collation processing part 25 from the candidates resulting from the retrieval of the file 254. In case the collation result in that the precedent coinciding with the fault of concern is present, then the recovery command generation processing part 27 retrieves a recovery or remedy procedure which is stored in association with the precedent for which the coincidence with the fault of concern has been found. The recovery procedure is transferred to the monitor/control apparatus 100 to be stored in the temporary storage file 104.

When a maintenance engineer has arrived the site of the computer system 200 in which the fault is taking place and input a command indicating "recovery" through the console device 102, the recovery procedure is outputted onto a display screen installed on the console 102 or through a hard copy unit (not shown). In this manner, during a period intervening between the occurrence of the fault and the arrival of a maintenance engineer at the site, analysis of the causes of the fault and generation of the recovery procedure are performed in parallel, whereby the time taken for the recovery can be shortened On the other hand, unless any precedent coinciding with the fault of concern is found after the collation, information reporting this fact is transferred to the monitor/control apparatus 100. Thus, the maintenance engineer inputting the command "recovery" can know that the analysis for the recovery must be made by himself or herself. To this end, the contents of the data buffer 6 and the temporary storage file 104 may be outputted onto the console device 102 or through the hard copy device. The console unit 102 is also imparted with a console function of the service processor (SVP) 207. After the recovery of the concerned computer system, the recovery procedure as taken is transferred to the supervision/maintenance computer system 250, which then stores the received recovery procedure in association with the content of the fault now removed in the precedent storage file 254. The information stored in the precedent storage file 254 is useful for coping with the similar or identical failure which may take place in the other sites or again in the computer site where the fault has been removed.

Figure 2:
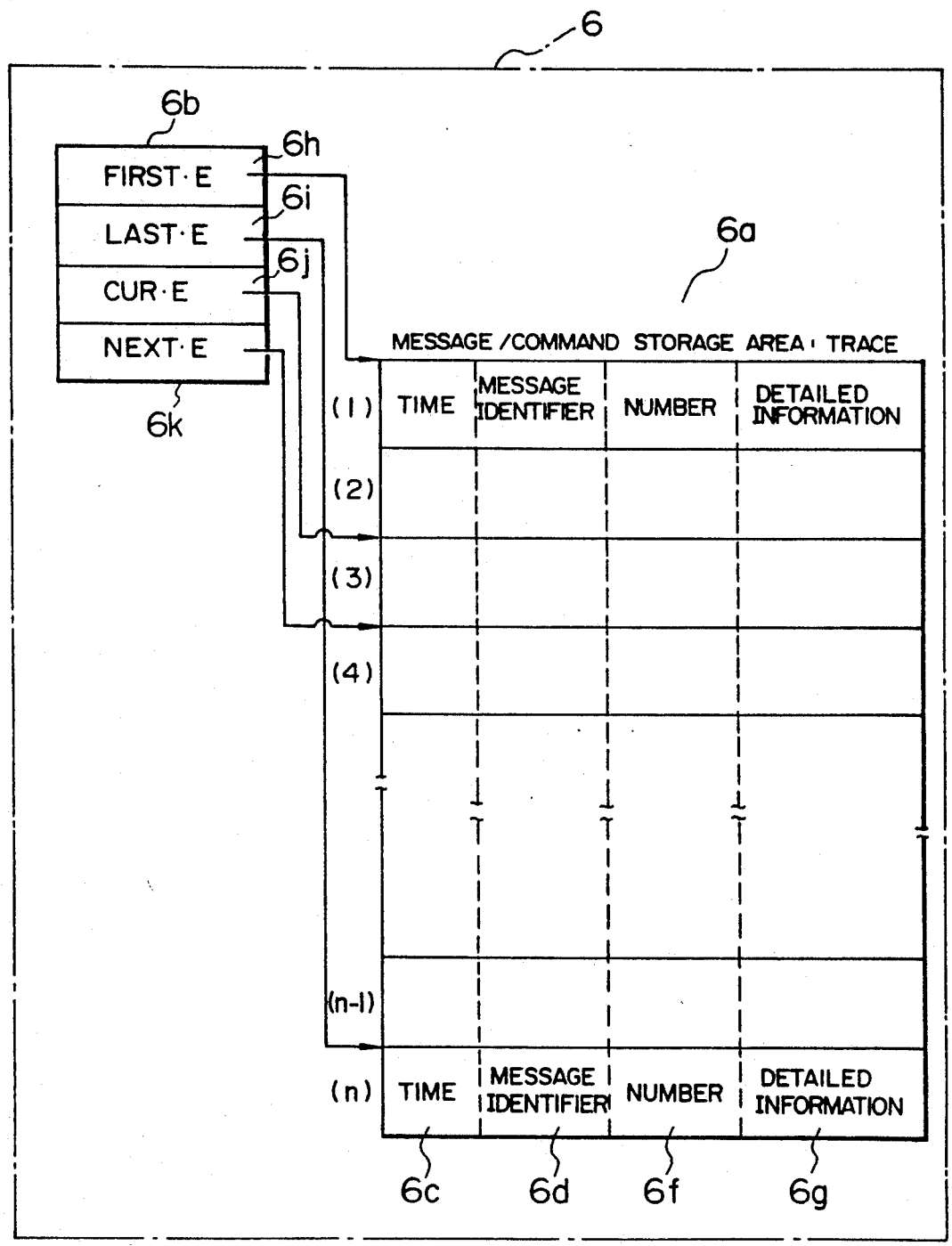
FIG. 2 is a diagram showing in detail a structure of a data buffer (6) shown in FIG. 1.
Figure 3:
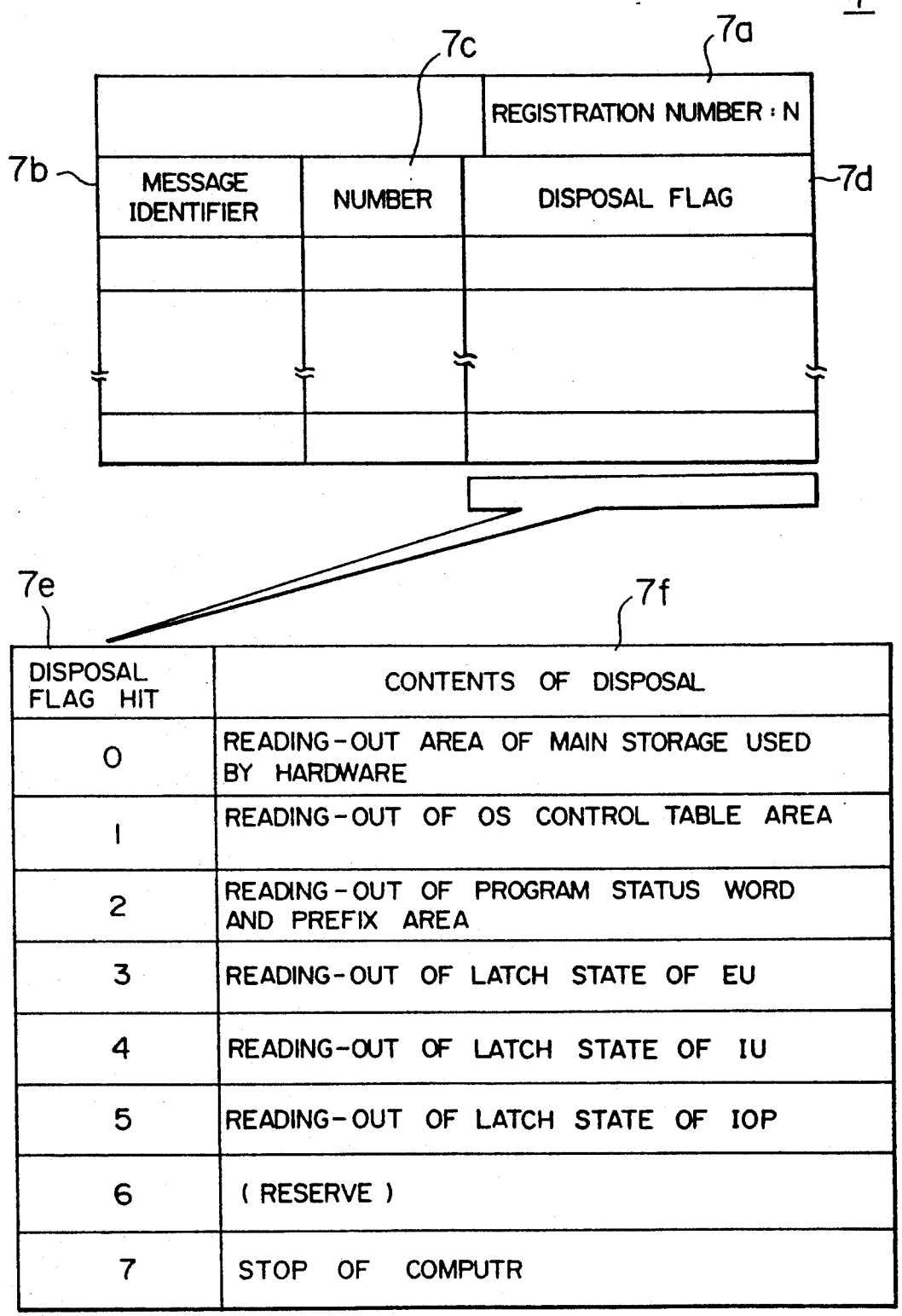
FIG. 3 is a diagram showing a structure of a comparison table (7)
Figures 4, 5:
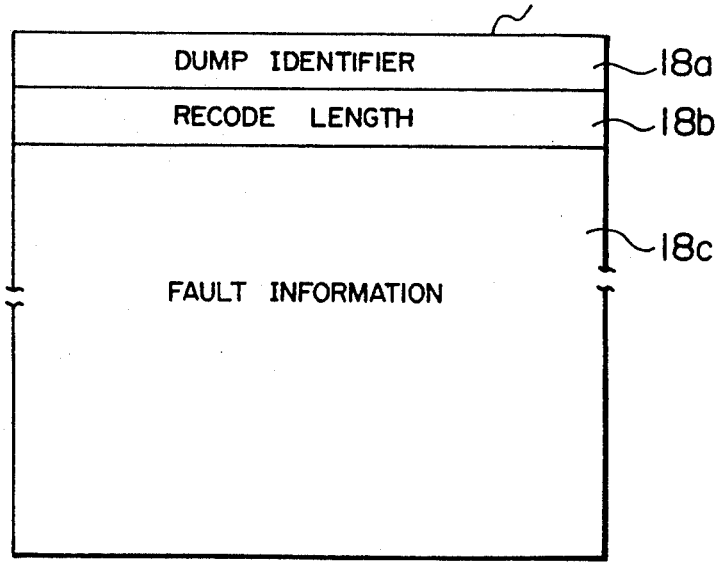
FIG. 4 is a diagram for illustrating correspondences between diagnosis numbers employed in a diagnoses processing part (8) and values for an address register (AD) 2 and a data register (DT) 3.
FIG. 5 is a view showing a data format of fault information employed for storing the latter in a temporary storage file (104) and transferring it to a supervision/-maintenance-dedicated computer system (250)
Figure 6:
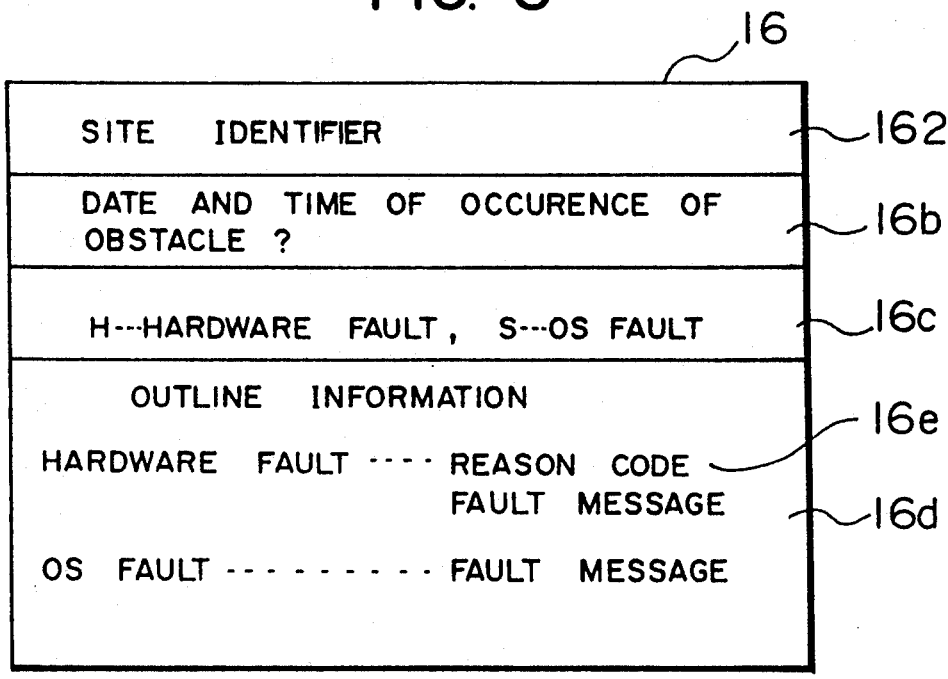
FIG. 6 is a view showing a data format employed when a global information concerning a fault occurrence is transferred from a monitor/control apparatus (100) to supervision/maintenance-dedicated computer system (250)
Figure 7:
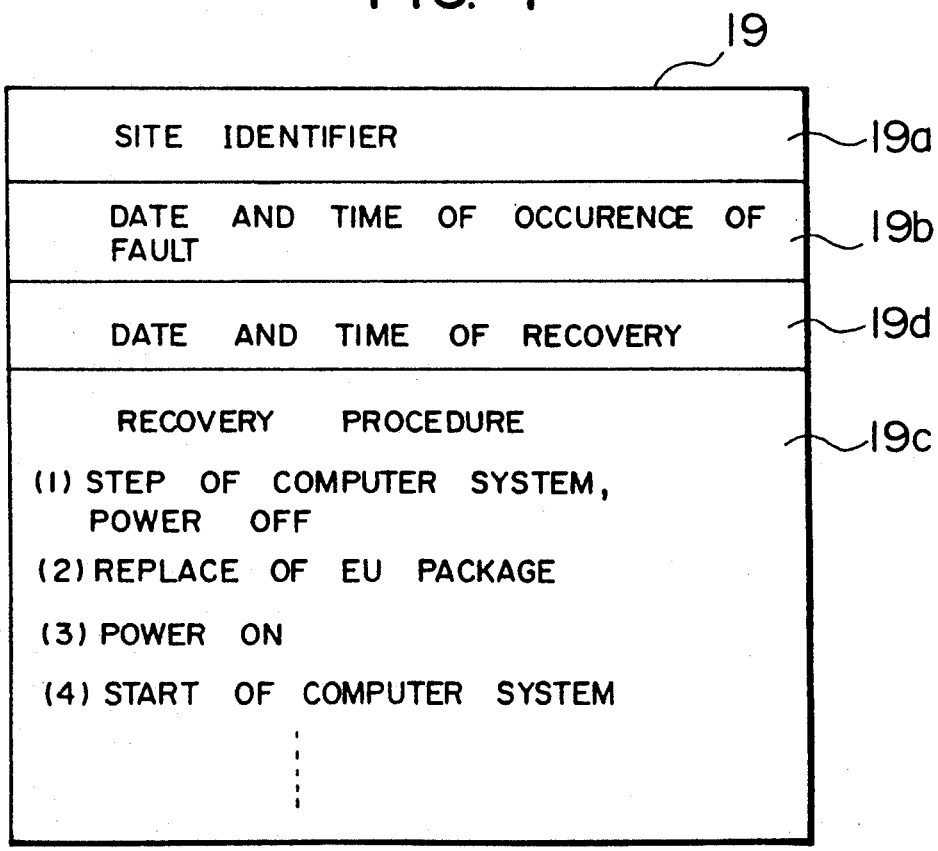
FIG. 7 is a view showing a data format which is employed when a recovery procedure is transferred from the supervision/maintenance-dedicated computer system to a monitor/control apparatus (100) or when a recovery procedure taken by a maintenance engineer at the site is transferred from the monitor/control apparatus (100) to the supervision/maintenance-dedicated computer system (250)
Figure 9:
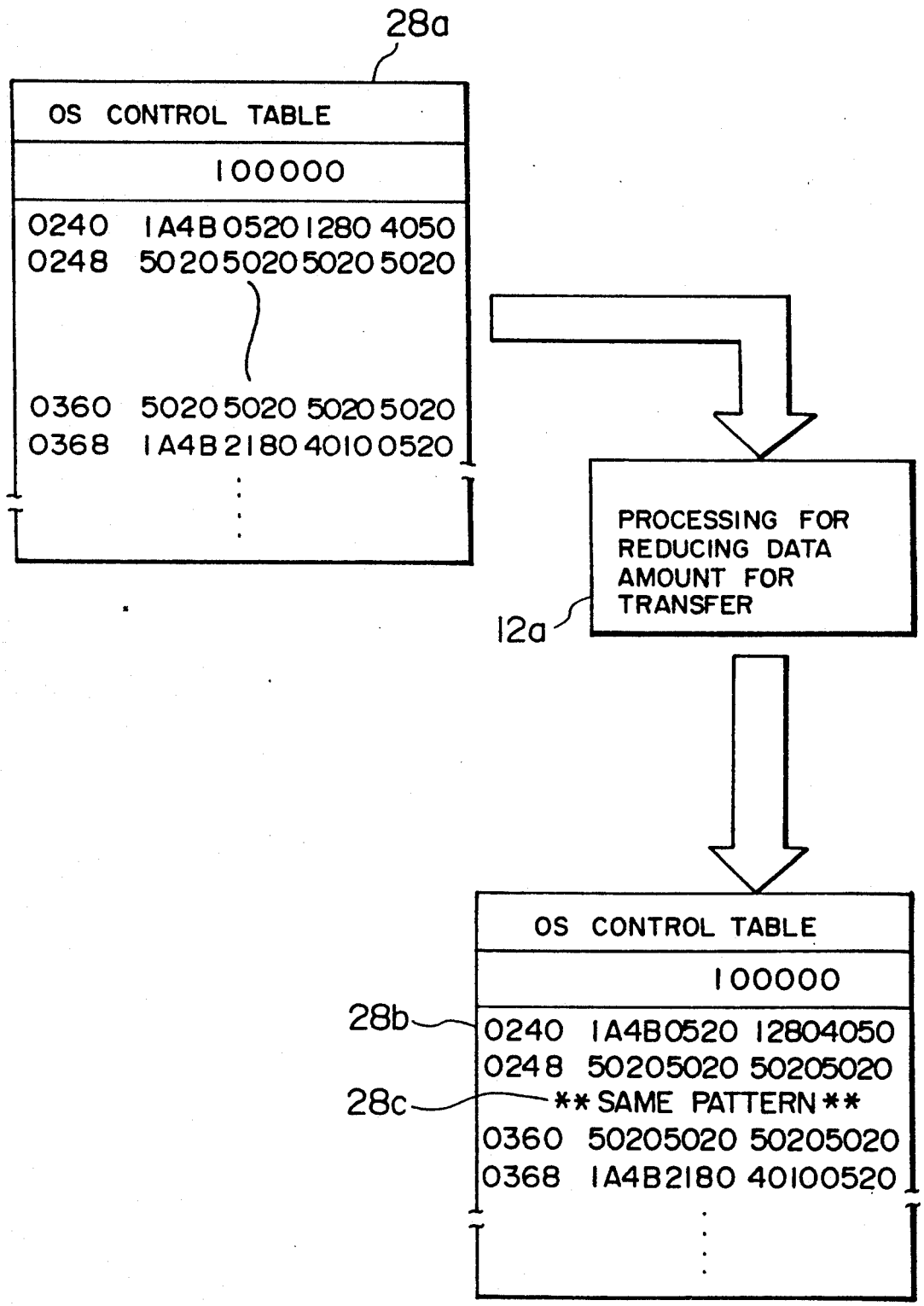
FIG. 9 is a diagram showing an example of a processing for reducing the amount of data upon transfer thereof from the monitor/control apparatus (100) to the supervision/maintenance-dedicated computer system.
Figure 10:
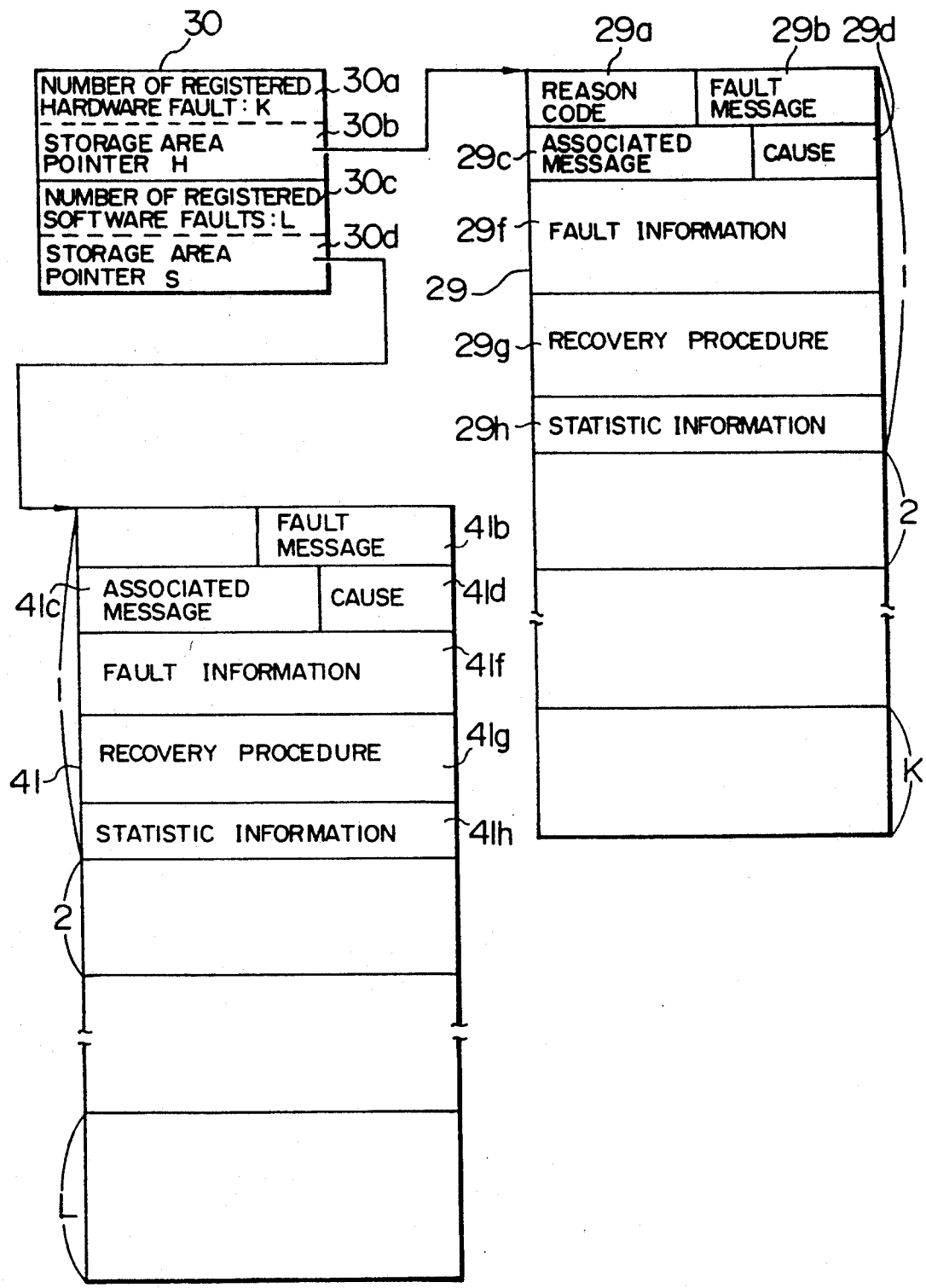
FIG. 10 is a diagram showing a structure of a precedent or record storage file (254).

Now, description will be made in detail of the failure monitoring apparatus for the information processing system as well as the control method according to the present invention by reference to FIGS. 2 et seq., in which FIG. 2 is a diagram showing in detail a structure of the data buffer 6 shown in FIG. 1, FIG. 3 is a diagram showing a structure of the comparison table, FIG. 4 is a diagram for illustrating correspondences between diagnosis numbers employed in the diagnoses processing part 8 and the values for the address register (AD) and the data register (DT) 3, FIG. 5 is a view showing a data format of the fault information employed for storing the latter in the temporary storage file 104 and transferring it to the supervision/maintenance-dedicated computer system 250, FIG. 6 is a view showing a data format employed when the global or outline information concerning the fault occurrence is transferred from the monitor/control apparatus 100 to supervision/maintenance-dedicated computer system 250, FIG. 7 is a view showing a data format which is employed when a recovery procedure is transferred from the supervision/maintenance-dedicated computer system to the monitor/control apparatus 100 or when the recovery procedure taken by the maintenance engineer at the site is transferred from monitor/control apparatus 100 to the supervision/maintenance-dedicated computer system 250, FIG. 8 is a view showing a format for the command issued from the console 102 and 252 or for the command issued to the monitor/control apparatus 100 from the supervision/maintenance-dedicated computer system 250, FIG. 9 is a diagram showing an example of the processing for reducing the amount of data upon transfer thereof from the monitor/control apparatus 100 to the supervision/maintenance-dedicated computer system, and FIG. 10 is a diagram showing a structure of a precedent storage file 254.

Figure 11:
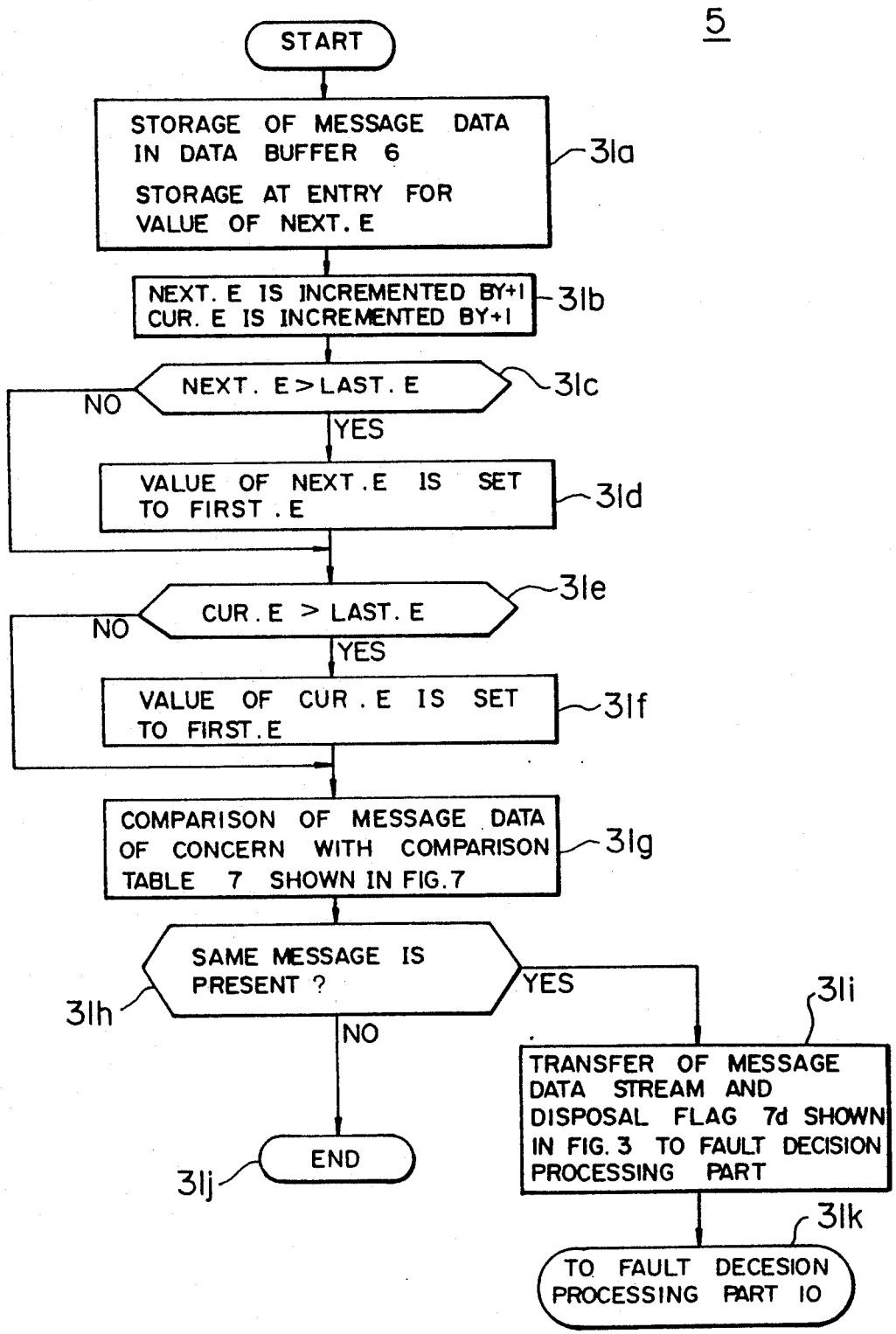
FIG. 11 is a flow chart illustrating a processing performed by a comparison processing part (5) shown in FIG. 1.
Figure 12:
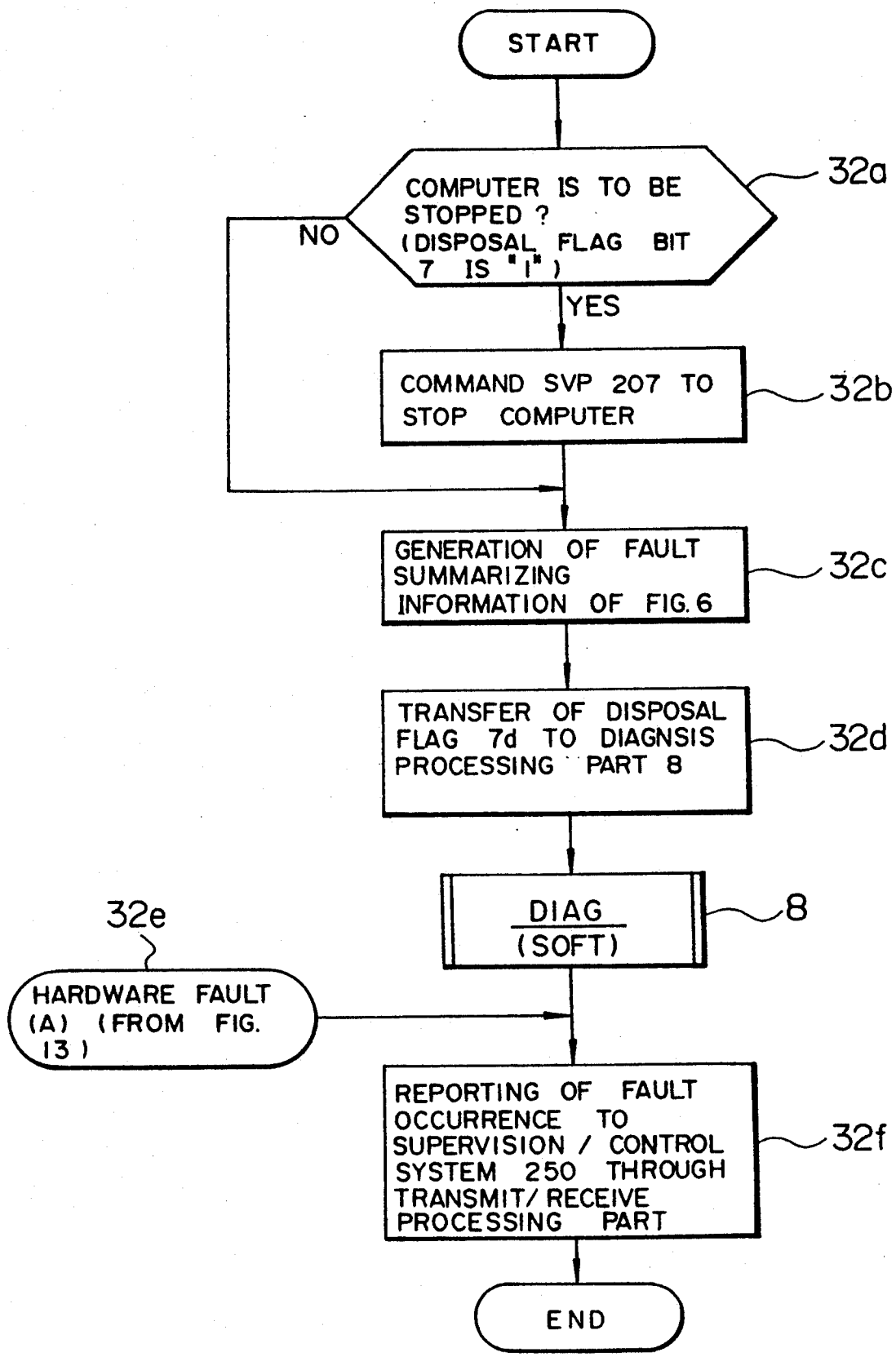
FIG. 12 is a flow chart for illustrating a processing executed by a fault decision processing part (10)
Figure 13:
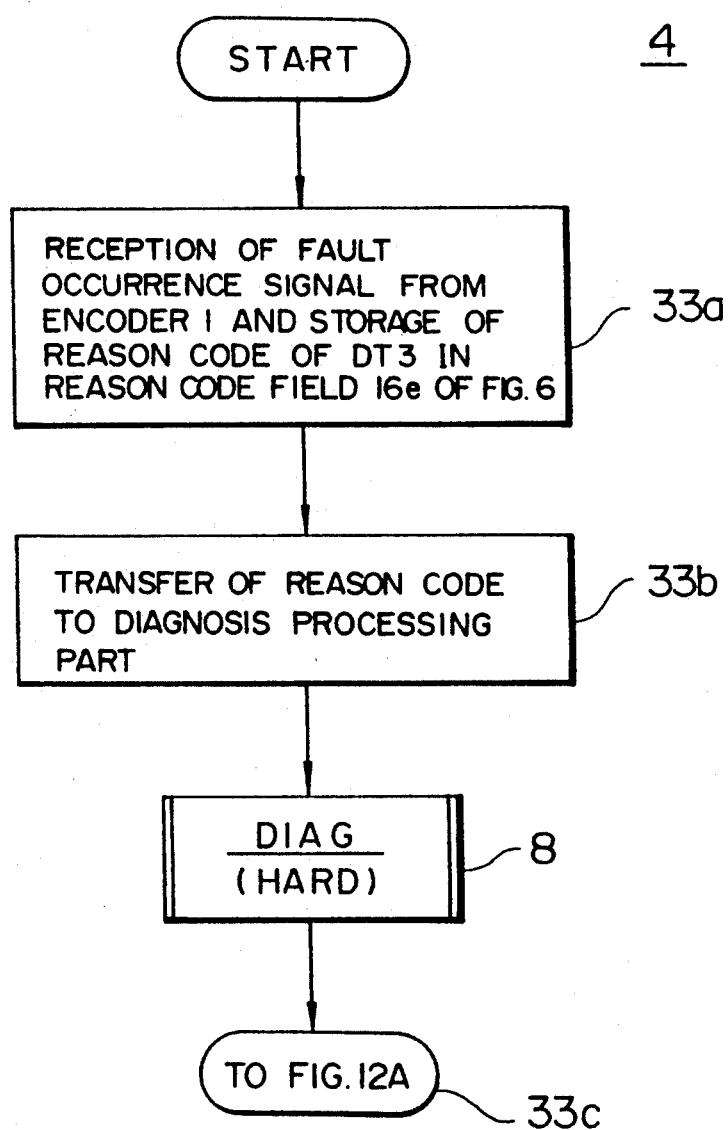
FIG. 13 is a flow chart for illustrating a processing performed by a CPU interface processing part (4)
Figure 15B:
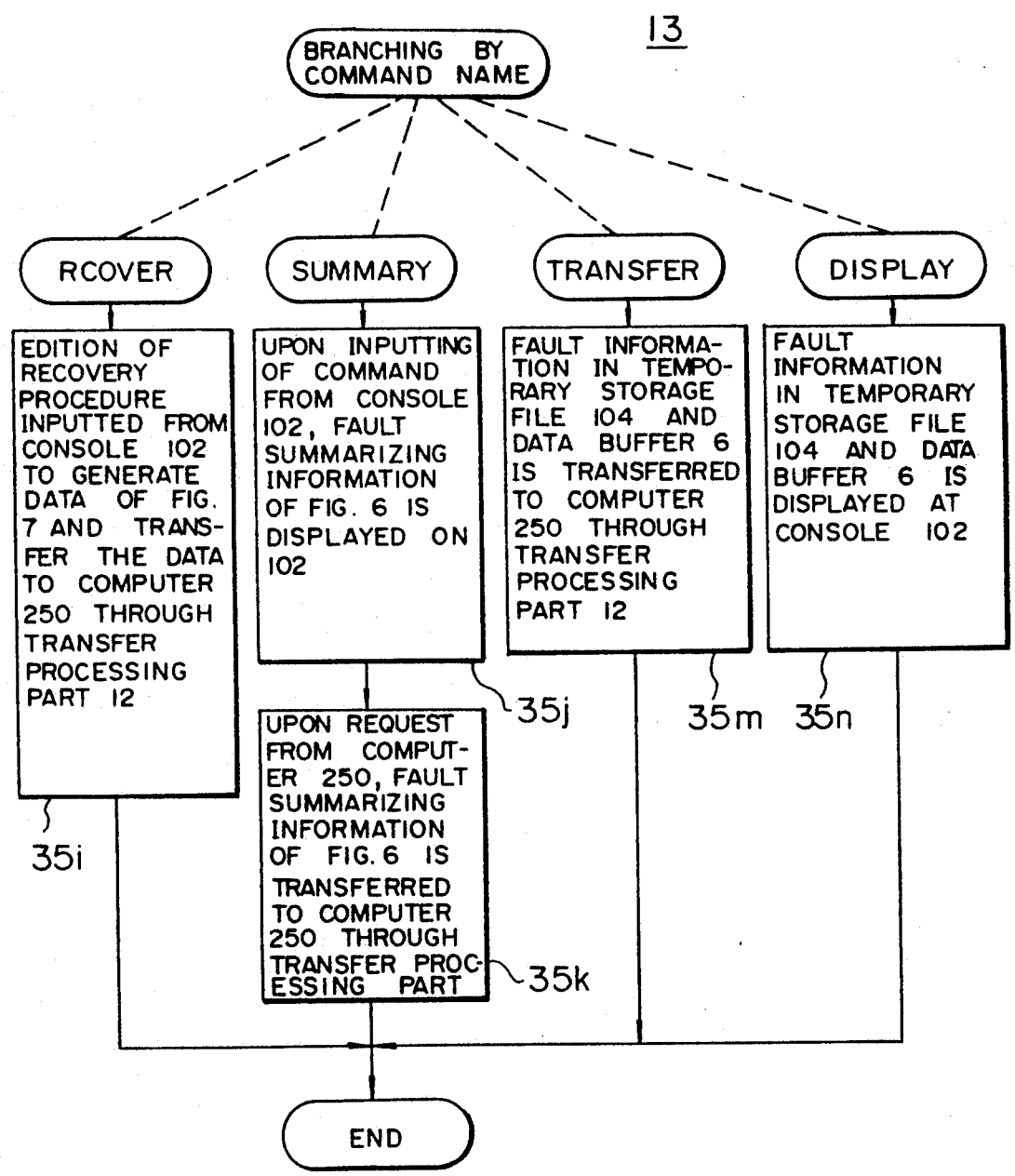
Figure 16A:
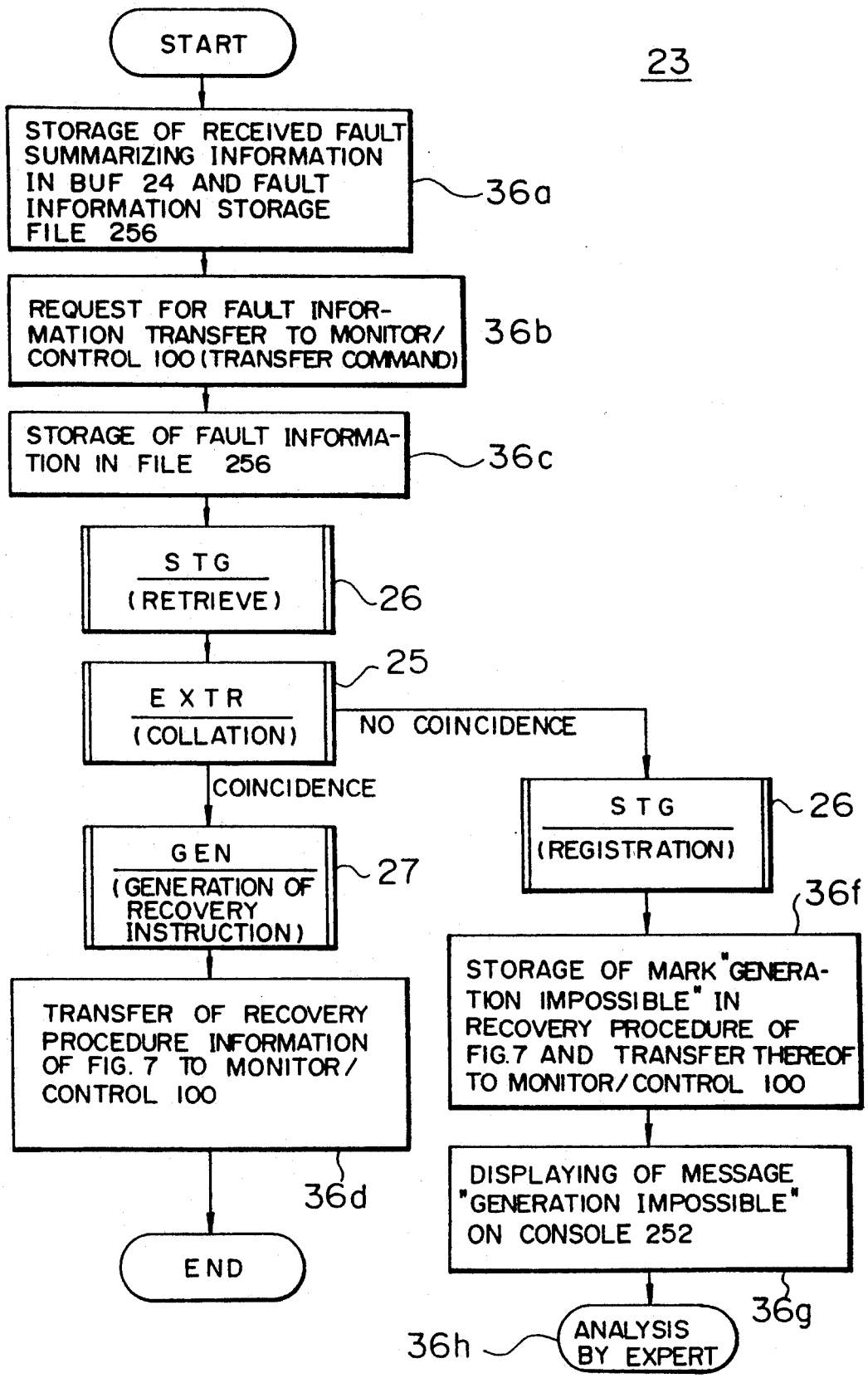
FIGS. 16A and 16B are flow charts for illustrating a processing executed by a collection/analysis processing part (23) incorporated in the supervision/maintenance-dedicated computer system (250)
Figure 16B:
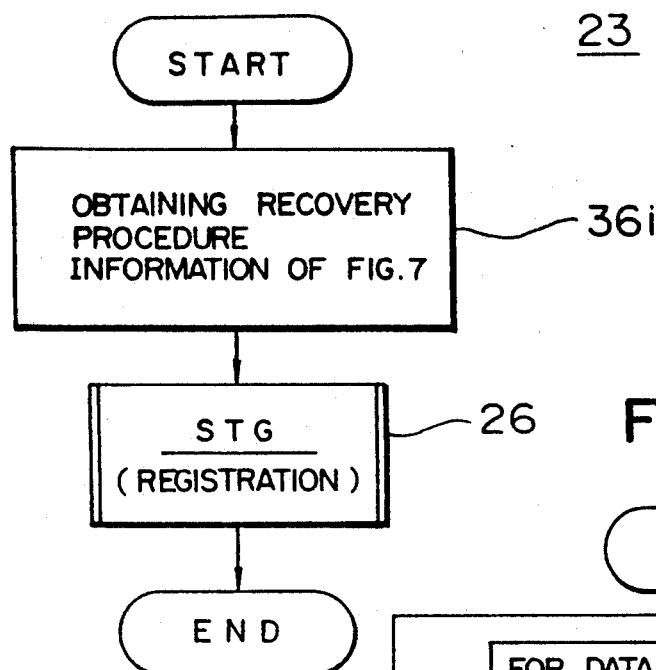
Figure 17:
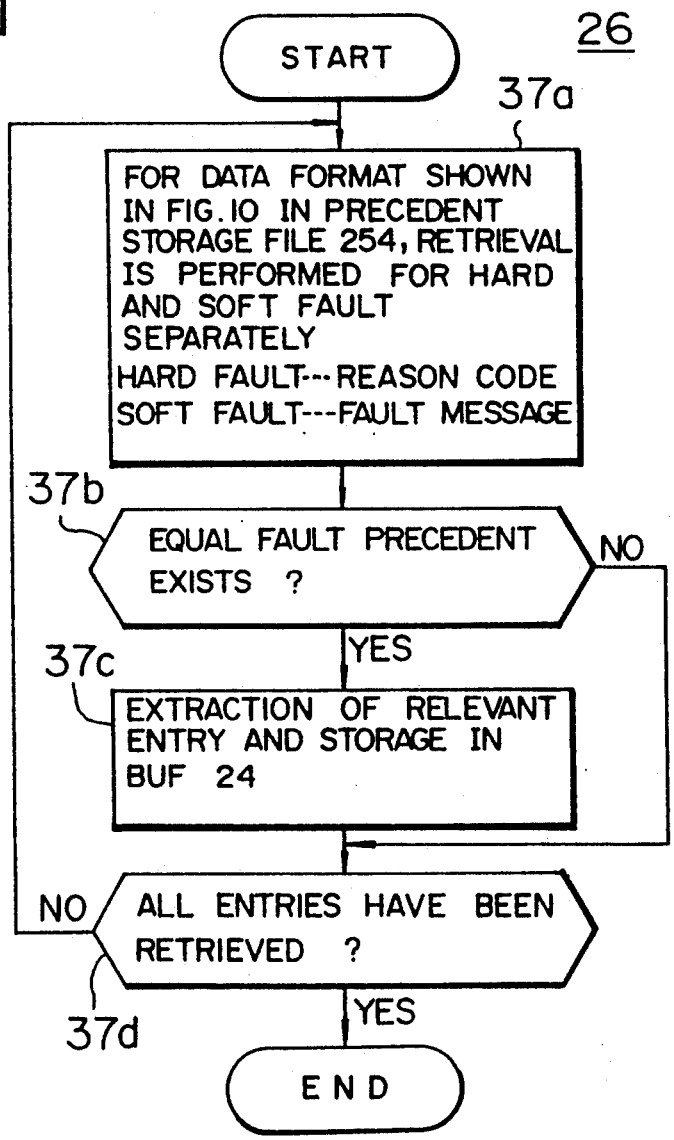
FIG. 17 is a flow chart for illustrating a retrieval or search processing executed by a precedent retrieval/-registration processing part (26)
Figure 18:
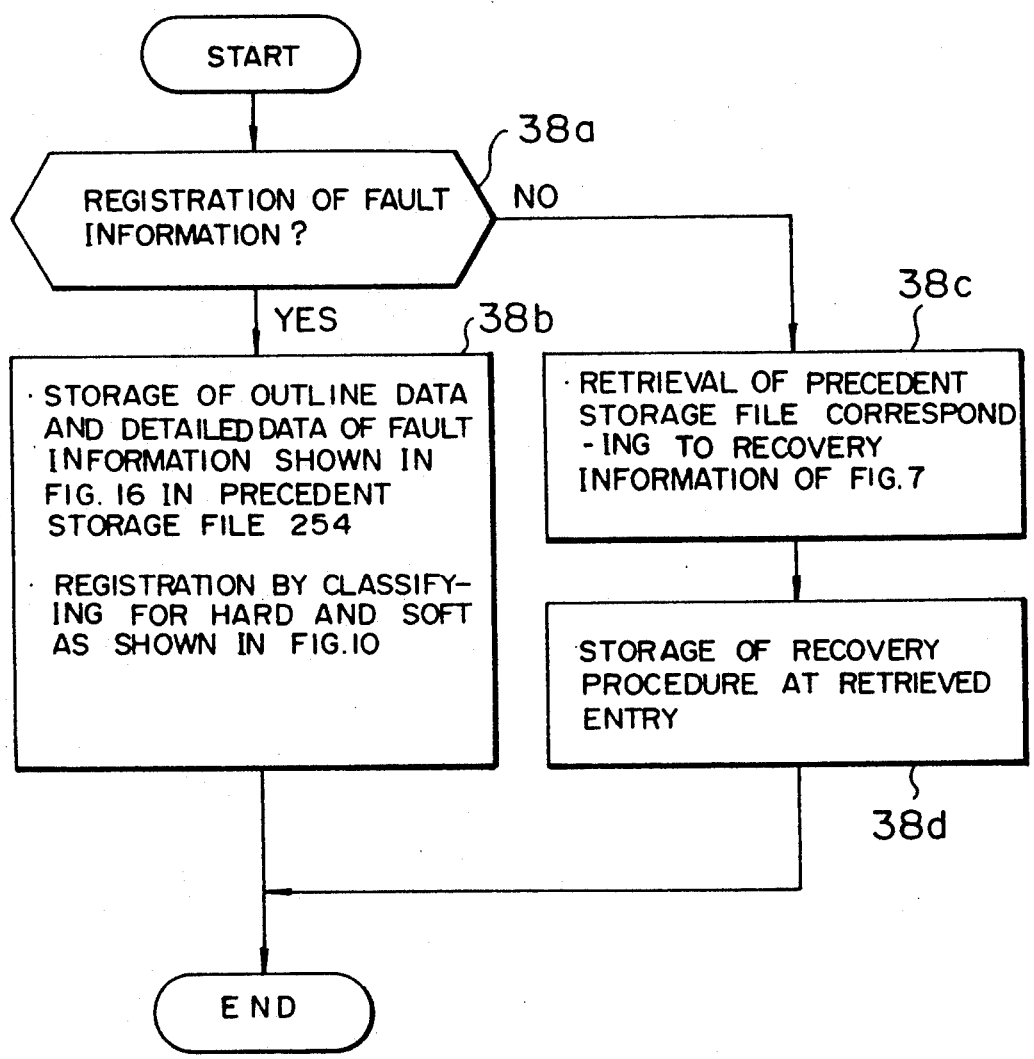
FIG. 18 is a flow chart for illustrating a registration processing executed by a precedent retrieval/registration processing part (26)
Figure 20:
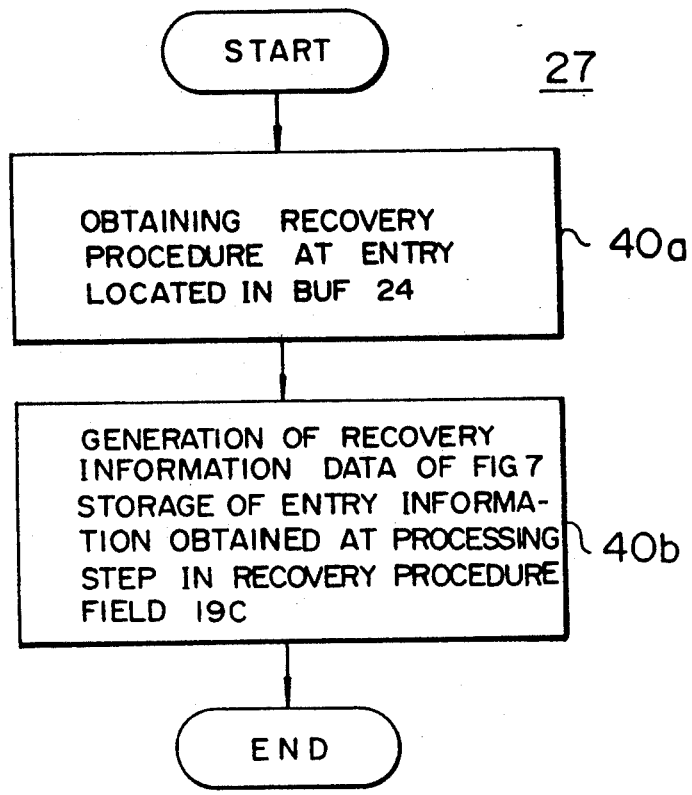
FIG. 20 is a flow chart for illustrating a processing executed by a recovery instruction generating processor part (27)
Figure 21:
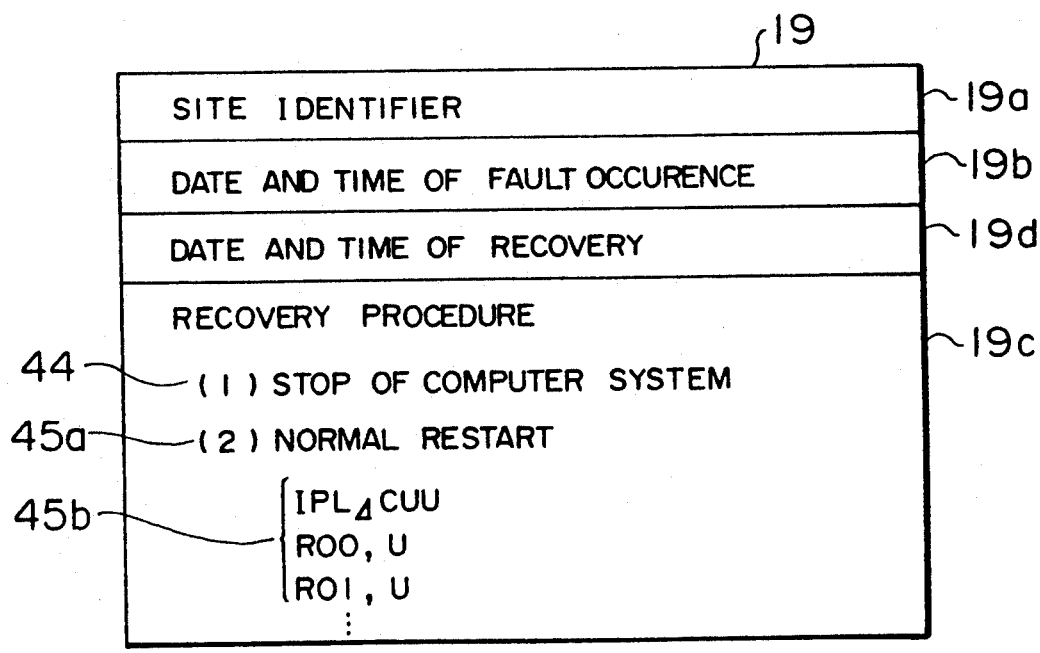
FIG. 21 is a view showing, by way of example, an arrayed series of commands contained in a recovery procedure (19c) for a fault recovery information (19) shown in FIG. 7 for rendering unnecessary the intervention of a maintenance engineer.
Figure 22:
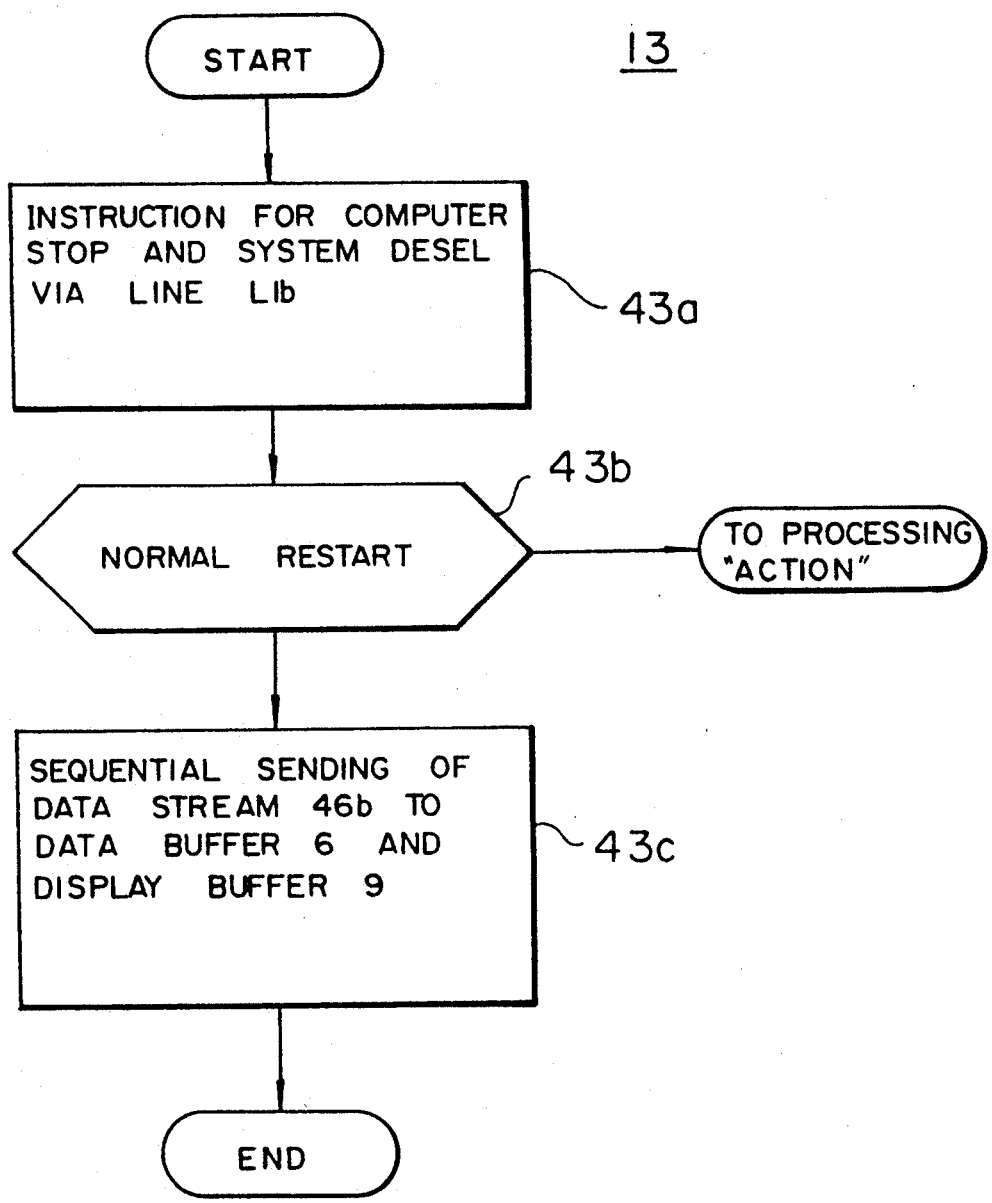
FIG. 22 is a flow chart for executing a recovery procedure (19c) executed by the command interpretation processing part (13).

Further, FIGS. 11 to 20 are views for illustrating processing flows executed by the various processing parts mentioned hereinbefore and FIGS. 21 and 22 are flow charts for illustrating the automatic recovery operation which requires no intervention of the maintenance engineer. More specifically, FIG. 11 is a flow chart illustrating the processing performed by the comparison processing part (CM) 5 shown in FIG. 1, FIG. 12 is a flow chart illustrating the processing executed by the fault decision processing part 10, FIG. 13 is a flow chart illustrating the processing performed by the CPU interface processing part 4, FIGS. 14A and 14B are flow charts for illustrating the processing executed by the diagnosis processing part 8, FIGS. 15A and 15B are flow charts for illustrating the processing executed by the command interpretation processing part 13 incorporated in the monitor/control apparatus 100, FIGS. 16A and 16B are flow charts for illustrating the processing executed by the collection/analysis processing part 23 incorporated in the supervision/maintenance-dedicated computer system 250, FIG. 17 is a flow chart for illustrating a retrieval or search processing executed by the precedent retrieval/registration processing part 26, FIG. 18 is a flow chart for illustrating a registration processing executed by the precedent retrieval/registration processing part 26, FIGS. 19A and 19B are flow charts for illustrating the processing executed by the collation processing part 25, FIG. 20 is a flow chart for illustrating a processing executed by the recovery instruction generating processor part 27, FIG. 21 is a view showing, by way of example, an arrayed series of commands contained in the recovery procedure 19c for the fault recovery information 19 shown in FIG. 7 for rendering unnecessary the intervention of the maintenance engineer, and FIG. 22 is a flow chart for executing the recovery procedure 19c.

Now, referring to FIG. 2, the data buffer 6 is composed of a message/command storage area (TRACE) 6a and a management table 6b. The message/command storage area (TRACE) 6a includes a field 6c for storing the time points at which message data and command data are generated, a field 6b for storing identifiers of the message data, a field 6f for storing the numbers of the message data, and a field 6g for storing detailed information. On the other hand, the management table 6b contains a first or start area pointer (FIRST. E) 6h for the message/command storage area (TRACE) 6a, a last or end area pointer (LAST. E) 6i, a current storage area pointer (CUR. E) 6j and a next storage area pointer (NEXT. E) 6k.

FIG. 3 shows a structure of the comparison table 7. As can be seen from the figure, this comparison table contains the number of registrations (N) 7a, a field 7b for storing message identifiers for the objects to be detected, a message number field 7c and a disposal flag field 7d. The processing flow executed by the comparison processing part (CMP) 5 is illustrated in FIG. 11. The output message data (hereinafter also referred to simply as message) from the computer system 200 to be monitored and controlled is processed by this comparison processing part (CMP) 5. Parenthetically, the command data loaded through the console unit 102 is once transferred to the computer system 200 and thereafter sent out from that computer system 200 as the message data.

Referring to FIGS. 1, 2, 3 and 11, when messages from the computer system 200, i.e. the messages of the operating system (OS) 208a are sequentially sent via the line L1a, the message data is stored in the data buffer 6 at the processing step 31a shown in FIG. 11. This data is stored at an entry indicated by the next storage area pointer (NEXT. E) 6k shown in FIG. 2. For the storage, the time point at which the message was generated is set at the time field 6c, whereon the message data is stored in the message identifier field 6h, the message number field 6f and the detailed information field 6g. The message data thus stored is also stored in the display buffer 9 by way of the distributor 11, whereby the message data can be displayed on the display screen of the console unit 102.

At a processing step 31b, the values of the next storage area point (NEXT. E) 6k and the current storage area pointer (CUR. E) 6j are each incremented by "+1". At processing steps 31c to 31f, it is checked whether or not the above mentioned values exceed that of the last area pointer (LAST. E) 6i. If the latter is exceeded, the former are each replaced by the value of the first area pointer (FIRST. E) 6h. Thus, the message/command storage area (TRACE) 6a of the data buffer 6 can store the data of messages, wherein the entries including the one at the position proceeding by one to the current storage area pointer (CUR. E) 6j to the entry at the next storage area pointer (NEXT. E) 6k represent the history information of the message data in the past. In the case of the example illustrated in FIG. 2, the entries (2), (1), (n), (n−1), . . . (5) and (4) constitute the history (or record) information of the message data in the past.

At a processing step 31g, the message identifier 6c and the message number 6f of the message data stored previously in the data buffer, i.e. the message data of the entry indicated by the current storage area pointer (CUR. E) 6j are compared with the message identifier 7b and the message number 7c contained in the comparison table 7 shown in FIG. 3. The comparison is performed a number of times equal to the number of registrations (N) 7a. When the result of the comparison shows that the message equal to the message data of the entry indicated by the current storage area pointer (CUR. E) 6j is registered in the comparison table, decision to this effect is made at a decision processing step 31h, whereon the abovementioned message data and the value of the disposal flag field 7d are transferred to the decision processing part 10 (processing steps 31i, 31k). To the contrary, when the comparison results in that no coincident message data exists in the comparison table 7, the processing step 31a is resumed for receiving the next message data.

FIG. 12 is a flow chart for illustrating the processing executed by the fault decision processing part 10 shown in FIG. 10 upon occurrence of a software fault or obstacle, while FIG. 13 shows a processing flow executed by the CPU interface processing part (CPUI) 4 upon occurrence of a hardware fault. Referring to FIG. 2, when the control is transferred from the comparison processing part (CMP) 5, the fault decision processing part 10 checks a bit 7 of the disposal flag 7e supplied as a parameter at a decision processing step 32a to thereby decides whether the relevant computer system under monitor is to be stopped or not. When the value of the bit 7 is "1", this means that the computer system be stopped, which can be accomplished by sending out a signal commanding the stop of the computer 200 to the service processor (SVP) 207 via the line L1B at a processing step 32b.

Next, at a processing step 32C, the fault outline information 16 shown in FIG. 6 is prepared. The fault outline information 16 includes a site identifier field 16a, a fault occurrence date/time field 16b, a fault species (type) field 16c and an outline information field 16d. In the case of a software fault, the value in the fault species field 16c is set to "S" with the fault message data being stored in the outline information field 16a. At a processing step 32d, the disposal flag 7d shown in FIG. 3 is prepared as a parameter to be supplied to the diagnosis processing part 8, which is then followed by transfer of the control to the diagnosis processing part 8 (designated by "DIAG" in the flow chart shown in FIG. 12). The fact that a software fault occurs is indicated by "SOFT".

Upon resuming of the control by the diagnosis processing part 8, the latter reports the occurrence of the fault to the supervision/maintenance-dedicated computer system 250 through the medium of the transmission/reception processing part 14. At this time point, the fault outline information 16 shown in FIG. 6 is transferred to the supervision/maintenance-dedicated computer system 250.

Next, operation performed up to the collection of information upon occurrence of a hardware fault will be described. FIG. 13 shows a processing flow executed by the CPU interface processing part (CPUI) 4. When a hardware fault takes place, this fact is reported to the CPU interface processing part (CPUI) 4 via the line L2 and the encoder 1. At this time point, a cause or factor code representing the cause or reason for the occurrence of the hardware fault is held by the data register DT3. At the processing step 33a, the fault outline information shown in FIG. 6 is prepared as in the case of the occurrence of the software fault. At this time point, the value set at the fault specie (type) field 16c is "H". Further, in addition to the storage of the message data at the time of fault occurrence in the outline information field 16d, the reason code held by the data buffer (DT) 3 is stored in the reason code field 16e.

At a processing step 33b, the control is transferred again to the diagnosis processing part 8 (designated by "DIAG" in the flow chart shown in FIG. 13) with the reason code 16e used as a parameter. At that time, the hardware fault is represented by "H". Upon resuming of the control by the diagnosis processing part 8, the control is transferred to a processing step 32f shown in FIG. 12 at the processing step 33c. The processing at the step 32f is to report the fault occurrence to the supervision/maintenance-dedicated computer system 250. Needless to say, the fault outline information 16 shown in FIG. 6 is transferred to the supervision/maintenance-dedicated computer system 250.

Figure 14A:
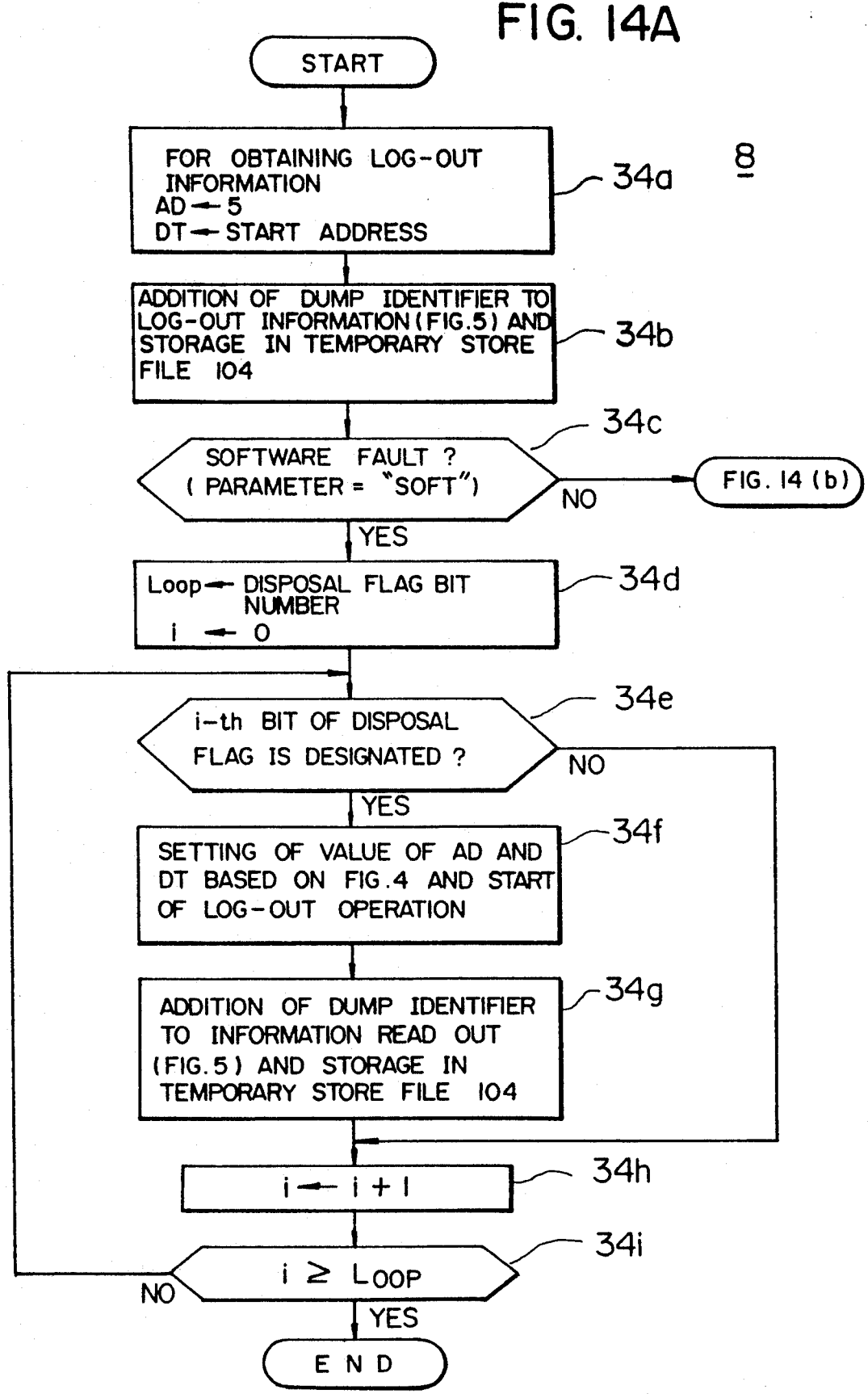
FIGS. 14A and 14B are flow charts for illustrating a processing executed by a diagnosis processing part (8)
Figure 14B:
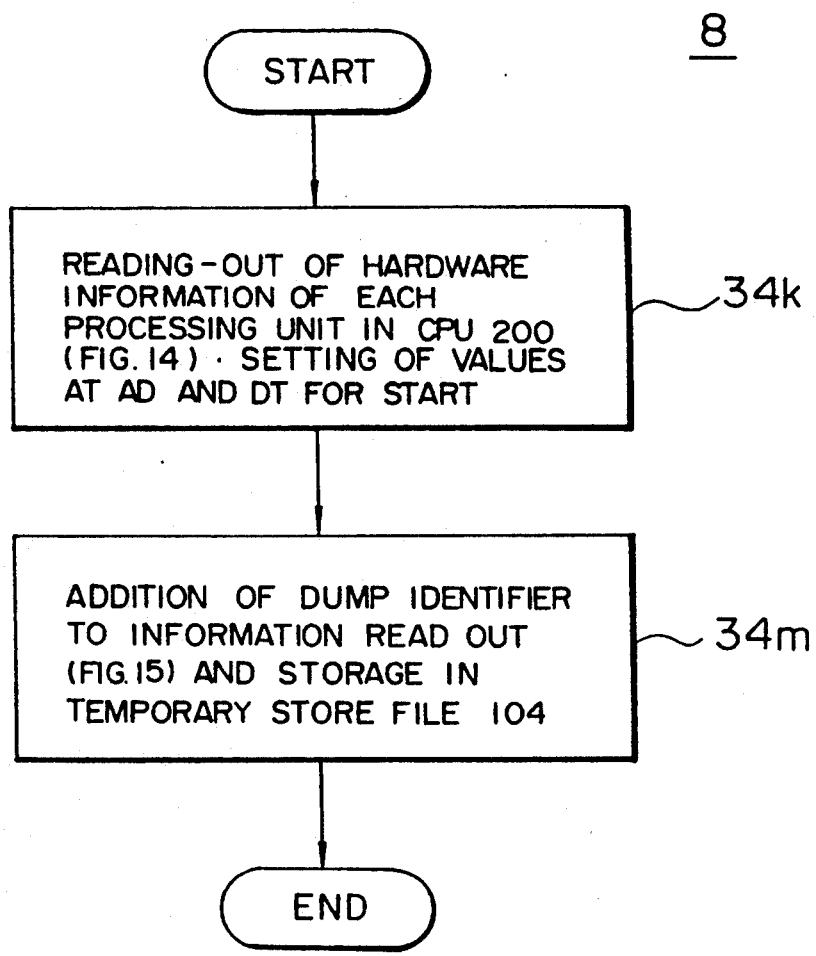

At this point, description will be made of the diagnosis processing part 8 shown in FIG. 1. Control is changed over to the diagnosis processing part 8 from the fault decision processing part 10 in the case of the occurrence of software fault and from the CPU interface processing part (CPUI) 4 when a hardware fault takes place. Further, operation of the diagnosis processing part 8 is also activated in response to the operation command issued from the console unit 102 and the supervision/maintenance-dedicated computer system. FIGS. 14A and 14B show processing flows executed when the fault occurrence is detected by the monitor/control apparatus 100.

Upon transition of the control from the fault decision processing part 10 or the CPU interface processing part (CPUI) 4 in response to the occurrence of a software fault or hardware fault, processing is performed at the processing step 34a to make preparation for obtaining log-out information held by each of the processing units incorporated in the computer system 200 to be monitored. When the hardware information such as log-out information of the individual processing units (such as IU 201, EV 203 and others) is to be obtained by the diagnosis processing part 8, corresponding values are set at the address register (AD) 2 and the data register (DT) 3 shown in FIG. 1. There are shown in FIG. 4 the values of the address register (AD) 2 and the data register (DT) 3 which correspond to the bit position number (bit position number for the 0th to n-th bit) of the disposal flag shown in FIG. 3. The values in the address registers (AD) 2 correspond to the numbers of the individual processing units and assigned with the addresses, as mentioned below:

| | | |
|---|---|---|
| 1) | Instruction unit (IU) 201 | "1". |
| 2) | Execution unit (EU) 202 | "2". |
| 3) | I/O processing unit (IOP) | "3". |
| 4) | Memory control unit (MCU) | "4". |
| 5) | Main storage (MS) | "5". |
| 6) | Service processor (SVP) | "6". |

Thus, since the log-out information exists in the area 206b used by hardware, the address register (AD) 2 is loaded with "5" corresponding to the main storage (MS) 206 while the data register (DT) 3 is loaded with the start address.

At a processing step 34b, the collected log-out information is stored in a fault information area 18a shown in FIG. 5 with the information indicating the log-out being set at the dump identifier 18a. Further, at a record length area 18b, the length of data collected is set in terms of the number of bytes. At a succeeding decision processing step 34c, decision is made as to whether the fault is a software fault or not. This decision is made on the basis of the parameter transferred to the diagnosis processing part 8. Unless the result of the decision processing 34c shows the software fault, i.e. when the fault is a hardware fault, then processing steps 34k to 34m shown in FIG. 14(B) are executed.

On the other hand, in the case of the software fault, i.e. when a fault or obstacle occurs in the operating system (OS) or the like, processing steps 34d to 34i are then executed. In the first place, at the processing step 34d, the bit number of the disposal flag 7e is set equal to the number of repetitions (number of loops) LOOP. Further, the Values of the counter i are initialized to "0". The quantities LOOP and i represent work variables which may be secured in a work area of the processing program or in a hardware part.

Execution of the processing steps 34e to 34i is repeated until the value of the counter i has attained the value of the loop number LOOP. In this processing, individual bits of the disposal flag 7e are checked, and when the bit value is "1", the information of hardware corresponding to that bit position number is collected. At the decision processing step 34e, the value at the bit position of the disposal flag 7e corresponding to the value of the counter i is checked. When this check results in no designation, i.e. when the abovementioned value is "0", the processing proceeds to the step 34*i*.

On the other hand, when the designation is found, the value is set at the address register (AD) 2 and the data register (DT) 3 at the processing step 34*f* to thereby start the log-out operation of the relevant processing unit. In this processing, the value of the counter i corresponds to the diagnosis number, as can be seen in FIG. 4, on the basis of which the value to be set at the address register (AD) 2 and the data register (DT) 3 can definitely be determined. Next, at a processing step 34*g*, the hardware information as read out is added with the dump identifier 18*a* shown in FIG. 5 and stored in the temporary storage file 104. When the dump identifier 18*a* represents the OS Control table of the diagnosis number 1, identification of "OS control table" is set. When the dump identifier 18*a* represents the hardware information of the execution unit "EU", identification of "EV" is set.

Next, at a processing step 34*h*, the value of the counter i is incremented by +1, and thereafter it is checked whether or not the value of the counter i has attained the value of the loop number LOOP. If the loop number value is not yet attained, return is made to the processing step 34*e*. On the other hand, when the value of the counter i has attained the value of the loop or repetition number LOOP, operation of this diagnosis processing part 8 comes to an end.

FIG. 14B shows a processing flow of the diagnosis processing part 8 executed upon occurrence of a hardware fault. These processings are transferred from the decision processing step 34*c* of FIG. 14(A). In the first place, at a processing step 34*k*, the hardware information is read out from the individual processing units incorporated in the computer system 200 at a processing step 34*k*. In this processing, values are set at the address register (AD) 2 and the data register (DT) 3 for activating the individual processing units. In the case of the embodiment now under consideration, information of all the diagnosis numbers 17*a* shown in FIG. 4 is collected. At a next processing step 34*m*, the hardware information read out is added with the information of the dump identifier 18*a* shown in FIG. 5 and stored in the temporary storage file 104.

Through the procedure described above, operations performed upon occurrence of the fault in the computer system 200 under supervision and control, i.e. the report of the fault occurrence to the supervision/maintenance-dedicated computer system 250 and the fault information collecting operation have been completed. At the site of the supervision/maintenance-dedicated computer system 250, dispatch of a maintenance engineer for attending the computer system 200 suffering from the fault, analysis of the causes of the fault, automatic generation of the recovery measures and other operations are performed. Before entering into description of these operations, let's consider first the operations of the command interpretation processing part 13 and the transfer processing part 12 of the monitor/control apparatus 100.

FIG. 8 shows formats of commands inputted through the console units 102 and 252 and the formats of commands issued by the monitor/maintenance-dedicated computer system 250. The command interpretation processing part 13 incorporated in the monitor/control apparatus 100 can be brought into operation by inputting manually corresponding commands through the console unit 102 or through the console unit 252 of the supervision/maintenance-dedicated computer system 250 or by automatically generating and sending a command data stream from the collection/analysis processing part 250 incorporated in the supervision/maintenance-dedicated computer system 250. Parenthetically, a list of commands shown in FIG. 8 is only by way of example for illustration of the embodiment of the present invention and may be added with other commands.

FIGS. 15A and 15B show processing flows corresponding to the commands shown in FIG. 8. At a processing step 35*a*, data streams for the commands are received, whereon the processing is branched correspondingly to the individual commands at a processing step 35*b*.

(1) GETMSG

This command is to store in the temporary storage file 104 the content of the data buffer 6 (designated by a symbol 6*a* in FIG. 2) at the areas including that pointed by the pointer (NEXT. E) 6*k* to the area which proceeds by one to that pointed by the pointer (CUR. E) 6*j* (processing step 35*c*).

(2) GETHARD

This command is provided for obtaining the hardware information of the individual processing units incorporated in the computer system 200 by activating the diagnosis processing part 8 for performing the processing steps 35*d* to 35*f*, as described hereinbefore.

(3) GETLOG

This command is also to serve for obtaining the hardware information of the individual processing units incorporated in the computer system 200. However, this command is employed for collecting among others the information held by hardware of the individual processing units (diagnosis numbers 3 to 6 shown in FIG. 4). Consequently, although the processing step 35*g* becomes operative, the diagnosis processing part 8 is activated for executing the processing as in the case of the command GETHARD (2) mentioned above.

(4) ACTION

This command is to serve for outputting the data stream for the fault recovery procedure sent from the supervision/maintenance-dedicated computer system 250 to the display device on the console unit 102 and the output device such as a hard copy device or the like (processing step 35*h*). FIG. 7 shows a format of the data stream 19 for the fault recovery procedure. It can be seen that a series of recovery procedures are stored in a recovery procedure field 19*c*.

(5) RECOVER

When the recovery procedure could not be generated by the supervision/maintenance-dedicated computer system 250 and hence when the maintenance engineer has recovered the computer system from the state suffering a fault at the site thereof by repeating trial and error procedure, this command RECOVER is used for transferring the recovery procedure taken by the maintenance engineer for successfully removing the fault to the supervision/maintenance-dedicated computer system 250. More specifically, at a processing step 35*i*, the recovery procedures inputted from the console unit 102 are stored sequentially in the recovery procedure field 19*c* shown in FIG. 7 while completing the other fields 19*a*, 19*b* and 19*d*. Thereafter, the recovery procedure thus completed is sent to the supervision/maintenance-dedicated computer system 250 via the transfer processing part 12.

(6) SUMMARY

This command is to serve for displaying the summarized information of the fault occurrence shown in FIG. 6. When this command is inputted from the console unit 102 of the computer system suffered from a fault, the fault summarizing information 16 illustrated in FIG. 6 is displayed on the display device installed on the console unit 102. On the other hand, when the command is issued from the console unit 252 of the supervision/maintenance-dedicated computer system 250 or by the collection/analysis part 23, the fault summarizing information 16 shown in FIG. 6 is transferred to the computer system 250 by way of the transfer processing part 12.

(7) TRANSFER

This command is used for transferring the fault information stored in the temporary storage file 104 to the computer system 250 at a processing step 35m. At this time, the transfer processing part 12 performs the processing for decreasing the amount of data to be transferred, as illustrated in FIG. 9. More specifically, a succession of same data strings in the fault information 28a is replaced by a mark 28c "SAME PATTERN" and thereafter transferred as a new data stream 28b. In this way, the amount of data transmitted along the line L4 can be reduced, to an advantageous effect.

(8) DISPLAY

This command is used when the maintenance engineer dispatched to the site of the fault suffering computer system desires to display the fault information stored in the temporary storage file 104 on the display device of the console unit 102 or on the display device installed on the console unit 252 of the supervision/maintenance-dedicated computer system 250. More specifically, at a processing step 35n, the contents of the temporary storage file 104 and the data buffer 6 are displayed with the aid of this command on the console unit of concern.

From the above, operations of the command interpretation processing part 13 will be understood. Of the command processings described above, it has been described in conjunction with the processing concerning the command "ACTION" that the recovery procedure is displayed to the maintenance engineer at the processing 35h, which is only for the purpose of illustrating the embodiment of the invention now under consideration. Needless to say, some recovery which does not require replacement of hardware parts can be realized without need for intervention of the maintenance engineer, as will be described hereinafter in conjunction with another embodiment of the present invention by reference to FIGS. 21 et seq.

Next, description will be directed to the operations carried out by the supervision/maintenance-dedicated computer system 250 upon reception of a report of fault occurrence from the monitor/control apparatus. The report or message of fault occurrence is performed by using the fault summarizing information shown in FIG. 6 which is transmitted to the communication processing part 21 via the line L4. In this case, the control is transferred to the collection/analysis processing part 23.

There is illustrated in FIG. 16A a processing flow which is executed when the fault report or message is received by the collection/analysis processing part 23. In the first place, the fault summarizing information 16 as received is stored in the work buffer (BUF) 24 and the fault information file 356 at a processing step 36a. At this time point, a maintenance engineer may be dispatched to the site of the computer system suffering the fault or alternatively he or she may be dispatched at the time point when the recovery procedure is determined at a later processing step 36d. Subsequently, at a processing step 36b, the command "TRANSFER" described hereinbefore by reference to FIG. 8 is issued to the monitor/control apparatus 100 in order to collect detailed fault information. The fault information collected is once stored in the fault information file 256 at a processing step 36c.

Subsequently, the fault summarizing information 16 is transferred to the precedent retrieval/registration processing part 26 together with the control, as indicated by "STG" in FIG. 16A. This means that "RETRIEVAL" request is issued. The precedent retrieval/registration processing part 26 extracts from the precedent storing file 254 a precedent fault case similar to that represented by the fault summarizing information 16, the extracted precedent case information being then stored in the work buffer (BUF) 24. This processing will be described later on by reference to FIG. 17. When the precedent information is stored in the work buffer (BUF) 24, the collation processing part (EXTR) 25 is activated. This collation processing part (EXTR) 25 performs comparison for the candidates by using the detailed failure information. When the comparison results in coincidence, the control is transferred to the recovery command generation processing part 27 together with the information of the precedent case for which coincidence has been found. On the other hand, unless the coincident precedent fault case is found, control is transferred back to the collection/analysis processing part 23.

When coincidence is found with a precedent fault case, the recovery instruction generation processing part 27 is activated for generating the recovery procedure. In FIG. 16A, the recovery instruction generating processing part 27 is designated by a symbol "GEN". The recovery instruction generation processing part 27 generates the recovery information 19 shown in FIG. 7, whereon the collection/analysis processing part 23 transfers the recovery information 19 to the monitor/control apparatus 100 at a processing step 36d.

On the other hand, when no coincidence is found with the precedent cases, the precedent retrieval/registration processing part (STG) 26 is activated for registering the occurring fault newly in the precedent storage file 254. In that case, "registration" is messaged. For this registration processing, the storage is done without stating clearly the recovery procedure. However, when the recovery procedure becomes definite or recovery has been made at the site of the computer system suffering the fault, the maintenance engineer inputs the command "RECOVER" shown in FIG. 8, whereby the recovery procedure has been completed. When the fault has been registered as a precedent by the precedent case retrieval/registration processing part (STG) 26, the control is again resumed by the collection/analysis processing part 23.

At the collection/analysis processing part 23, an indication that the recovery procedure could not be generated is stored in the recovery procedure field 19c shown in FIG. 7 at a processing step 36f, whereon the corresponding data stream 19 is transferred to the monitor/control apparatus 100. Thereafter, at a processing step 36g, the report that the recovery procedure could not be generated is displayed at the console unit 252 of the supervision/maintenance-dedicated computer system 250 in order to take advice from an expert. At a processing step 36h, the expert analyzes the fault by inputting the command shown in FIG. 8 through the console unit 25 to search the recovery procedure. At that time, the maintenance engineer is also searching the recovery procedure at the site of the computer system suffering the fault in parallel. In case the recovery procedure is decided earlier at the supervision/maintenance-dedicated computer system 250, then the recovery information 19 shown in FIG. 7 is transferred to the monitor/control apparatus 100.

FIG. 16B illustrates a recovery procedure registration procedure performed by the collection/analysis processing part 23. For the registration of the recovery procedure, the command "RECOVER" shown in FIG. 8 may be inputted from the console unit 102 of the monitor/control apparatus 100 or from the console unit 252 of the supervision/maintenance-dedicated computer system 252. Incidentally, operation of the interpretation command processing part 22 of the supervision/maintenance-dedicated computer system 250 may be considered to be basically identical with the operation of the command interpretation processing part incorporated in the monitor/control apparatus 100. At a processing step 36i, the recovery information 19 shown in FIG. 7 is made available. Now, the precedent retrieval/registration processing part (STG) 26 is activated to complete the precedent case information for the fault for which the recovery procedure was incomplete.

Next, by reference to FIG. 10 and FIGS. 17 to 20, description will be made of the precedent case retrieval/registration processing part 26, the collation processing part 25 and the recovery instruction generating processing part 27. FIG. 10 shows a structure of the precedent case storage file 254. The hardware faults and the software faults are stored separately in the precedent case storage file 254 with a view to speeding up the retrieval. However, it is not intended to store the two types of faults in separate files, respectively. Referring to FIG. 10, the hardware faults and the software faults in the precedent case storage file 254 are managed separately with the aid of the management table 30. In conjunction with the hardware fault precedents, the number of registered hardware faults (K) 30a and the storage area pointer (H) 30b are stored. Further, the entity of the precedent case is pointed by a storage area pointer (H) 30b. The unity precedent information 29 is composed of a reason code field 29a, a fault message field 29b, an associated message field 29c, a cause field 29d, a fault information field 29f, a recovery procedure field 29g and a statistic information field 29h. There is stored in the reason code field 29a the reason code 16e contained in the fault summarizing information 16 shown in FIG. 6, while content of the fault message field 16d being stored in fault message field 29b. The associated message field 29c stores a message associated with the fault message 29 or the factor message which brought about the fault message 29 and which is retrieved from the message pointed by the pointer (CUR. E) 6j of the data buffer 6. Further, the fault information field 29f stores therein the information collected at the time when the fault occurred, as described previously. Further, the recovery procedure field 29g is adapted to store the recovery procedure performed for remedying the fault of concern such as the recovery procedure indicated in the recovery procedure field 19c shown in FIG. 7. Further, the statistic information field 29h stores statistic information such as the number of times the fault of concern took place.

On the other hand, the entities of the software fault information are managed with the aid of the number of software faults registered (L) 30c and the storage area pointer (S) 30d in the management table 30, wherein the entity of the unity precedent case information 41 is same as that of the hardware fault information except that the reason code does not exist in the software fault information.

FIG. 17 is a flow chart illustrating a retrieval processing executed by the precedent retrieval/registration processing part (STG) 26. Referring to FIG. 17, outline information 16d of the failure summarizing information shown in FIG. 10 is compared with the entries 29 and 41 contained in the precedent storage file 254 at processing steps 37a and 37b, respectively. More specifically, for the hardware fault, the reason code 29a is used for the comparison, while for the software fault, the failure message 41b is used for the comparison. When the result of the comparison shows that there exists the entry identical with the fault summarizing information 16, that entry is stored in the work buffer (BUF) 24 as one of candidates at a processing step 37c. Then, the processing steps 37a to 37c are repeated until search has been made for all the entries at a decision processing step 37d. Through the procedure described above, the candidate which corresponds to the fault summarizing information 16 is stored in the buffer (BUF) 24. Subsequently, the precedent case coinciding with the fault which is taking place is extracted by the collation processing part 25.

FIG. 18 is a flow chart for illustrating the registration processing executed by the precedent retrieval/registration processing part (STG) 26. At first, at a decision processing step 38a, it is decided whether the processing to be executed is for the registration of fault information or for the registration of recovery information. In the case of the registration of the fault information, the processing step 38b is executed, while for the registration of the recovery information, there are executed processing steps 38c and 38d. When the fault information is to be registered, the fault summarizing information 16 and the detailed information shown in FIG. 6 are stored in the information area 29 or the information area 41 in dependence on whether the abovementioned information concerns a hardware fault or a software fault. On the other hand, when the recovery information is to be stored, the precedent information corresponding to the recovery information shown in FIG. 7 or the precedent information 41 is retrieved. Subsequently, the recovery procedure 19c shown in FIG. 7 is stored in the recovery procedure field 29g for the retrieved precedent information 29 or in the recovery procedure field 41g for the precedent information 41.

FIGS. 19A and 19B are flow charts for illustrating the processings executed by the collation processing part 25 shown in FIG. 1. At a processing step 39a, decision is made as to whether the collation is for a hardware fault or a software fault. In the case of the collation for the hardware fault, the processing steps 39i to 39p shown in FIG. 19B is executed. On the other hand, for the collation of the software fault, processing steps 39b to 39h are executed. In the first place, at a processing step 39b, the number of candidates for the precedent stored in the work buffer (BUF) 24 is set at a work variable "Count". Next, the counter i is initialized to "0". Parenthetically, the work variable "Count" and the counter may be secured in hardware or into work area, as described hereinbefore in conjunction with FIG. 14(a).

At a processing step 39c, the counter i is incremented by +1, and then decision is made as to whether or not the value of the counter i has exceeded the value of the work variable "Count". When the value of the counter i exceeds that of the work variable "Count", this means that there exists no precedent which coincides with the fault of concern. Thus, the collation processing comes to an end with the result of discrepancy. Unless the value of the counter i exceeds that of the work variable "Count", then decision is made as to the equality of the fault message 41b at a processing step 39e. Unless coincidence is found, return is made to the processing step 39c. Next, at a decision processing step 39f, decision is made as to the equality or coincidence of the associated message 41c. When coincidence is found as to the fault message 41b as well as the associated message 41c, check is performed as to coincidence of the fault information 41f at a decision processing step 39g. When the result shows no coincidence, return is made to the processing step 39c. On the other hand, when the coincidence is found, the recovery procedure 41g at the entry indicated by the counter i is transferred to the processing part which called the collation processing part 25 under consideration, i.e. the collection/analysis processing part 23. Thus, the collation processing comes to an end with the result of coincidence. At this time point, the number of times the faults occurred as contained in the statistic information is incremented by +1.

FIG. 19B shows a precedent collation processing for a hardware fault. At first, the number of candidates for the precedent stored in the work buffer (BUF) 24 is set at the work variable "Count" at a processing step 39j. Subsequently, the counter i is initialized to "0". Next, after the counter i is incremented by +1 at a processing step 39k, decision is made as to whether the Value of the counter i exceeds that of the work variable "Count". When the former exceeds the latter, this means that the precedent which coincides with the fault is absent. Thus, the collation processing comes to an end, while indicating the lack of coincidence. Unless the value of the counter i exceeds that of the work variable "Count", decision is made as to the equality in respect to the reason code 29a at a decision step 39n. When the decision results in the lack of coincidence, the processing step 39k is then resumed. Next, check is performed as to coincidence in respect to the fault information 29f at a decision processing step 39o. When no coincidence is resulted, return is made to the processing step 39k. On the other hand, when coincidence is found, the recovery procedure 29g at the entry indicated by the counter i is transferred to the processing part which called the collation processing part 25 under consideration, i.e. the collection/analysis part 23, at a processing step 39p. Thus, the collation processing comes to an end with the result of coincidence. At this time point, the number of the faults occurred which is contained in the statistic information 29h is incremented by +1.

The operations or processings performed by the collation processing part 25 shown in FIG. 1 can now be understood from the above description.

Now, description will be made of operation of the recovery instruction generating processing part 27. FIG. 20 is a flow chart for illustrating the processings executed by the recovery instruction generating processing part 27. At first, the precedent information selected through the collation or the recovery procedure 29g for the precedent information 41 or the recovery procedure 41g is made available in the work buffer (BUF) 24 at a processing step 40a. Next, at a processing step 40b, the fault recovery information 16 shown in FIG. 7 is generated. More specifically, the recovery procedure 29g or 41g obtained at the processing step 40a is stored in the field 19c. In this conjunction, the fields 19a-19b shown in FIG. 7 can be obtained by copying or mapping the field 16a-16b shown in FIG. 6. Further, the recovery date/time field 19d is loaded with the date and the time at which the recovery procedure was generated through this processing step.

Next, description will be turned to an automatic recovery operation which requires no intervention of the maintenance engineer such as replacement of a hardware package. FIG. 21 shows an example of data stream 45a which is stored in the recovery procedure field 19c of the recovery information shown in FIG. 7 for use in manipulating the console unit for a normal reactivation or restart of the computer system. In this conjunction, FIG. 22 is a flow chart showing the processings performed by the command interpretation processing 13. The command interpretation processing part 13 may operate by checking a list of commands shown in FIG. 8 and the contents of the recovery information 19. At first, at a processing step 43a, the computer system 200 to be controlled is stopped in accordance with a command string 44 shown in FIG. 21 and a system reset instruction is issued, which is then sent to the service processor (SVP) 207 via the line L1b by storing the command data for the abovementioned operation in the data buffer 6. At the next decision processing step 43b, the data 45a is checked to determine whether or not the normal restart is indicated. If not the normal restart, the succeeding data stream 45b is outputted onto the console unit 102, hard copy equipment and others, as described hereinbefore in conjunction with the command "ACTION".

When the normal restart is designated, the data stream 45b for the recovery procedure is stored in the data buffer 6 and the display buffer 9 at a processing step 43c. Thus, the data stream 45b is displayed also on the console unit 102 and can be sent to the service processor (SVP) 207 and the operating system (OS) 208a of the computer system 200 via the lines L1a and L1b.

As will now be understood from the foregoing description, there is provided according to the teachings of the present invention the monitor/control apparatus installed at the computer system to be monitored or controlled for monitoring constantly the behavior of the computer system, wherein upon occurrence of a fault or obstacle, information of the fault of the computer system is automatically collected to be subsequently transferred to the remotely located supervision/maintenance-dedicated computer system. In response, a maintenance engineer is instantly dispatched to the site of the computer system suffering from the fault from the site of the supervision/maintenance dedicated computer system, while the fault information is collated with that of the precedent fault cases to thereby generate the appropriate measures for the recovery at the site of the supervision/maintenance-dedicated computer system. Thus, the maintenance engineer arrived at the site of the fault suffering computer system is automatically supplied with the instructions for the recovery. In this manner, the time taken for recovering the computer system from the occurrence of the fault can significantly be reduced.

Further, for the fault which requires no intervention of the maintenance engineer for the removal thereof, the restart of the computer system can automatically be effected. Thus, one step has been made toward realization of the unattended operation service, to a great advantage.

Besides, since the remotely located supervision/maintenance-dedicated computer system monitors or supervises a plurality of computer systems as to occurrence of faults, a number of computer systems can be operated and managed by a small number of persons.

Additionally, because the remotely located supervision/maintenance-dedicated computer system stores the fault information and the measures for recovery end block for a plurality of computer systems, accumulation of the fault managing information is now possible.

What is claimed is:

1. A fault monitoring and controlling system for a data processing system, comprising:
    a computer system including a main storage, a central processing unit and a manipulating means equipped with functions for operation and maintenance of said central processing unit and an operation system,
    a monitor and control apparatus connected to said computer system for performing a fault monitoring and controlling operation for said computer system;
    a remotely located supervision and control system for providing information to said monitor and control apparatus for supervising and controlling said computer system;
    wherein said monitor and control apparatus comprises:
    first storage means for storing message data of said operation system of said computer system or command data inputted from said manipulating means;
    second storage means for storing reference message data for detecting abnormal states;
    comparison means for comparing message data of said operation system with contents of said second storage means;
    fault decision means for deciding whether a fault has occurred on the basis of said comparison; and
    report control means for automatically reporting the occurrence of the fault to said remotely located supervision and control system.

2. A fault monitoring and controlling system for a data processing system, comprising:
    a computer system including a main storage, a central processing unit and a manipulating means equipped with functions for operation and maintenance of said central processing unit and an operation system,
    a monitor and control apparatus connected to said computer system for performing a fault monitoring and controlling operation for said computer system;
    a remotely located supervision and control system for providing information to said monitor and control apparatus for supervising and controlling said computer system;
    wherein said monitor and control apparatus comprises:
    means for displaying a message data received from said operation system and a service processor on a console unit;
    means for sending a command data inputted from said console unit to said operation system and said service processor;
    means for recording a history of said message and command data;
    means for detecting an occurrence of a fault in said computer system by comparing said message data with a fault message previously stored;
    means for storing a predetermined number of message data of the operation system and said service processor of said computer system; and
    means for sending the contents of said storing means to said remotely located supervision and control system in response to a command issued by said supervision and control system.

3. A fault monitoring and controlling system for a data processing system, comprising:
    a computer system including a main storage, a central processing unit and a manipulating means equipped with functions for operation and maintenance of said central processing unit and an operation system,
    a monitor and control apparatus connected to said computer system for performing a fault monitoring and controlling operation for said computer system;
    a remotely located supervision and control system for providing information to said monitor and control apparatus for supervising and controlling said computer system;
    wherein said monitor and control apparatus comprises:
    means for receiving hardware fault information indicating occurrence of a fault in said central processing unit of the computer system from a service processor and processing units in said computer system;
    means for accumulating the hardware fault information to produce an accumulated history of hardware fault information;
    means for detecting the occurrence of the hardware fault in said computer system; and
    means for reporting the detected hardware fault to said remotely located supervision and control system.

4. A fault monitoring and controlling system for a data processing system, comprising:
    a computer system including a main storage, a central processing unit and a manipulating means equipped with functions for operation and maintenance of said central processing unit and an operation system,
    a monitor and control apparatus connected to said computer system for performing a fault monitoring and controlling operation for said computer system;
    a remotely located supervision and control system for providing information to said monitor and control apparatus for supervising and controlling said computer system;

wherein said monitor and control apparatus comprises:

means for receiving hardware fault information indicating an occurrence of a fault in said central processing unit of said computer system;

means for storing said hardware fault information;

means for reading out, from a memorizing means, a hardware fault state of said central processing unit on the basis of a command issued from said remotely located supervision and control system; and means for sending information read out to said remotely located supervision and control system.

5. A fault monitoring and controlling system for a data processing system, comprising:

a computer system including a main storage, a central processing unit and a manipulating means equipped with functions for operation and maintenance of said central processing unit and an operation system, a monitor and control apparatus connected to said computer system for performing a fault monitoring and controlling operation for said computer system; and a remotely located supervision and control system for providing information to said monitor and control apparatus for supervising and controlling said computer system;

wherein said remotely located supervision and control system comprises:

fault precedent storage means for storing precedent fault information to serve as a precedent when said remotely located supervision and control system receives fault occurrence information from said monitor and control apparatus;

collation means for collating said fault occurrence information with the contents of said fault precedent storage means;

recovery processing procedure generating means for generating a recovery processing procedure for remedying a fault when said collation performed by said collation means shows the presence of a precedent which coincides with the fault; and sending means for sending the recovery processing procedure generated by said recovery processing procedure generating means to said monitor and control apparatus.

6. A fault monitoring and controlling system for a data processing system according to claim 5, wherein said recovery processing procedure generated by said recovery processing procedure generating means includes sending means for causing said remotely located supervision and control system to send said recovery processing procedure when a maintenance person loads a command requesting reference to the recovery processing procedure into said manipulating means of said computer system, and display control means for displaying the received recovery processing procedure which will later be displayed on a console/display unit associated with the monitor and control apparatus which has received said recovery processing procedure.

7. A fault monitoring and controlling system for a data processing system according to claim 6, wherein the manipulating means of said computer system and a console/display unit of said remotely located supervision and control system are in data communication with each other.

8. A fault monitoring and controlling system for a data processing system according to claim 3, wherein said means for receiving hardware fault information includes execution control means for executing an instruction for generating a fault occurrence signal when a predetermined monitor program operating on said monitor and control apparatus and designed to constantly inspect a state of said hardware detects an abnormality in the state of said hardware.

9. A fault monitoring and controlling system for a data processing system according to claim 3, wherein said means for receiving hardware fault information includes execution control means for executing an instruction for generating a fault occurrence signal when a hardware monitoring mechanism operating on said monitor and control apparatus detects an abnormality in an operating state of said hardware.

10. A fault monitoring and controlling system for a data processing system according to claim 4, wherein said hardware fault read-out means includes address control means for assigning addresses to individual processing units of said central processing unit and reception control means for receiving the hardware states held by the addressed individual processing units through a dedicated data line.

11. A fault monitoring and controlling system or a data processing system according to claim 4, wherein said hardware fault read-out means includes read control means for reading out data from a specific area of said main storage which specific area can not be accessed by said operating system.

12. A fault monitoring and controlling system for a data processing system according to claim 4, wherein said hardware fault read-out means includes control means for sending a storage area address to said main storage for obtaining corresponding data.

13. A fault monitoring and controlling system for a data processing system according to claim 11, wherein said hardware fault read-out means includes control means for sending a storage area address to said main storage for obtaining corresponding data.

14. A fault monitoring and controlling system for a data processing system according to claim 4, further comprising storage control means for storing in predetermined storage means the hardware state information read out by said hardware fault read-out means.

15. A fault monitoring and controlling system for a data processing system according to claim 11, further comprising storage control means for storing in predetermined storage means the hardware state information read out by said hardware fault read-out control means.

16. A fault monitoring and controlling system for a data processing system according to claim 12, further comprising storage control means for storing in predetermined storage means the hardware state information read out by said hardware fault read-out control means.

17. A fault monitoring and controlling system for a data processing system according to claim 1, wherein said means for reporting includes sending control means for editing said fault information to be sent out when said means for reporting transmits said fault information to said remotely located supervision and control system.

18. A fault monitoring and controlling system for a data processing according to claim 2, wherein said means for sending the contents of said storing means includes sending control means for editing fault information to be sent out when said means for sending transmits said fault information to said remotely located supervision and control system.

19. A fault monitoring and controlling system for a data processing system according to claim 3, wherein said means for reporting includes sending control means for editing said fault information to be sent out when said means for reporting transmits said fault information to said remotely located supervision and control system.

20. A fault monitoring and controlling system for a data processing system according to claim 4, wherein said means for sending includes sending control means for editing said fault information to be sent out when said means for sending transmits said fault information to said remotely located supervision and control system.

21. A fault monitoring and controlling system for a data processing system according to claim 17, wherein said sending control means includes extraction processing means for extracting message data from said operating system and command data from said manipulating means when the contents of said first storage means are edited.

22. A fault monitoring and controlling system for a data processing system according to claim 18, wherein said sending control means includes extraction processing means for extracting message data from said operating system and command data from said manipulating means when the contents of said storing means are edited.

23. A fault monitoring and controlling system for a data processing system according to claim 19, wherein said sending control means includes extraction processing means for extracting message data from said operating system and command data from said manipulating means when contents of a first storage means are edited.

24. A fault monitoring and controlling system for a data processing system according to claim 20, wherein said sending control means includes extraction processing means for extracting message data from said operating system and command data from said manipulating means when the contents of a first storage means are edited.

25. A fault monitoring and controlling system for a data processing system according to claim 17, wherein said sending control means includes control means for editing the contents of said first storage means when hardware information is edited and data reducing means for replacing a succession of similar data which appears when editing the contents of said main storage with data representing said data succession.

26. A fault monitoring and controlling system for a data processing system according to claim 18, wherein said sending control means includes control means for editing the contents of said storing means when hardware information is edited and data reducing means for replacing a succession of similar data which appears when editing the contents of said main storage with data representing said data succession.

27. A fault monitoring and controlling system for a data procession system according to claim 19, wherein said sending control means includes control means for editing the contents of a predetermined storage means when hardware information is edited and data reducing means for replacing a succession of similar data which appears when editing the contents of said main storage with data representing said data succession.

28. A fault monitoring and controlling system for a data processing system according to claim 20, wherein said sending control means includes control means for editing the contents of a predetermined storage means when hardware information is edited and data reducing means for replacing a succession of similar data which appears when editing the contents of said main storage with data representing said data succession.

29. A fault monitoring and controlling system for a data processing system according to claim 5, wherein said fault precedent storage means stores therein phenomenon and causes of fault occurrence and a remedying record of the fault.

30. A fault monitoring and controlling system for a data processing system according to claim 5, further including control means for storing the fault for which no corresponding precedent is found as a result of collation performed by said collating means as a new fault record to serve as a precedent in said fault precedent storage means.

31. A fault monitoring and controlling system for a data processing system according to claim 5, wherein when a corresponding precedent can not be found as a result of collation performed by said collating means, control means is provided for displaying an absence of the corresponding precedent on a console/display unit when a maintenance person inputs a command requesting reference to the recovery processing procedure through the manipulating means of said computer system, and wherein processing means is provided for displaying the contents of first storage means and predetermined storage means on said console/display unit.

32. A fault monitoring and controlling system for a data processing system according to claim 30, further including control means for storing the fault for which no corresponding precedent is found as a result of collation performed by said collating means and for which a cause, phenomenon and recovery procedure are later found in said fault precedent storage means by associating the cause of the fault and the recovery procedure with the phenomenon of said fault.

33. A fault monitoring and controlling system for a data processing system according to claim 5, further including processing means for displaying the fault information obtained from first storage means and predetermined storage means on a display output unit of said remotely located supervision and control system when no corresponding precedent is found as a result of the collation performed by said collation means.

34. A fault monitoring and controlling system for a data processing system, comprising:
a computer system including a main storage, a central processing unit and a manipulating means equipped with functions for operation and maintenance of said central processing unit and an operation system,
a monitor and control apparatus connected to said computer system for performing a fault monitoring and controlling operation for said computer system; and
a remotely located supervision and control system for providing information to said monitor and control apparatus for supervising and controlling from a remote site said computer system;
wherein when a software or hardware fault takes place in said computer system and when fault information of the occurrence of the software or hardware fault is received by said remotely located supervision and control system, said fault information is collated with a content of a fault precedent storage means incorporated in said remotely located supervision and control system, and when a precedent coinciding with said fault is present, recovery processing procedure for removing the fault from said computer system is generated and transferred to said monitor and control apparatus provided in association with said computer system suffering from the fault, said monitor and control apparatus receiving said recovery processing procedure, restarting said computer system in accordance with said recovery processing procedure, and displaying said recovery processing procedure on a console unit of said monitor and control apparatus.

35. A fault monitoring and controlling method for a data processing system which comprises:
a computer system including a main storage, a central processing unit and a manipulating means equipped with functions for operation and maintenance of said central processing unit and an operation system;
a monitor and control apparatus connected to said computer system for performing a fault monitoring and controlling operation for said computer systems; and
a single remotely located supervision and control system for providing information to said monitor and control apparatus for supervising and controlling said computer system;
wherein said monitor and control apparatus performs:
a first storage step for storing a predetermined number of message data of the operation system of the computer system or command data inputted through said manipulating means;
a second storage step for storing message data for detecting abnormal states;
a comparison step for comparing said message data of said operation system with the contents of a second storage means;
a fault decision step for deciding occurrence of a fault based upon the result of said comparison; and
a report control step for reporting automatically the occurrence of the fault to said remotely located supervision and control system.

36. A fault monitoring and controlling method for a data processing system which comprises:
a computer system including a main storage, a central processing unit and a manipulating means equipped with functions for operation and maintenance of said central processing unit and an operation system,
a monitor and control apparatus connected to said computer system for performing a fault monitoring and controlling operation for said computer systems; and
a single remotely located supervision and control system for providing information to said monitor and control apparatus for supervision and controlling said computer system;
wherein said monitor and control apparatus performs:
a first storage step for storing a predetermined number of message data of the operation system of the computer system or command data inputted for said manipulating means; and
a send control step for sending contents of a first storage means to said remotely located supervision and control system in response to a command issued by said supervision and control system.

37. A fault monitoring and controlling method for a data processing system which comprises:
a computer system including a main storage, a central processing unit and a manipulating means equipped with functions for operation and maintenance of said central processing unit and an operation system,
a monitor and control apparatus connected to said computer system for performing a fault monitoring and controlling operation for said computer system; and
a single remotely located supervision and control system for providing information to said monitor and control apparatus for supervising and controlling said computer system;
wherein said monitor and control apparatus performs:
a control step for receiving a signal indicating occurrence of a fault in hardware of said central processing unit of the computer system; and
a report control step for reporting automatically the occurrence of the fault to said remotely located supervision and control system.

38. A fault monitoring and controlling method for a data processing system which comprises:
a computer system including a main storage, a central processing unit and a manipulating means equipped with functions for operation and maintenance of said central processing unit and an operation system,
a monitor and control apparatus connected to said computer system for performing a fault monitoring and controlling operation for sad computer system; and
a single remotely located supervision and control system for providing information to said monitor and control apparatus for supervising and controlling said computer system;
wherein each of said monitor and control apparatus performs:
a control step for reading out fault state of hardware in said central processing unit based upon a command issued from said remotely located supervision and control system; and
a send control step for sending out information read out to said remotely located supervision and control system.

39. A fault monitoring and controlling method for a data processing system, comprising:
a computer system including a main storage, a central processing unit and a manipulating means equipped with functions for operation and maintenance of said central processing unit and an operation system,
a monitor and control apparatus connected to said computer system for performing a fault monitoring and controlling operation for said computer system; and
a single remotely located supervision and control system for providing information to said monitor and control apparatus for supervising and controlling said computer system;
wherein said single remotely located supervision and control system performs:
a fault precedent storing step for storing fault information as a record to serve as a precedent when said remotely located supervision and control system receives fault occurrence information from said monitor and control apparatus;

a collating step for collating said fault occurrence information with the contents of a fault precedent storage means; and a recovery processing procedure generating step for generating a recovery processing procedure for remedying the fault when said collation performed by a collation means shows the presence of a precedent which coincides with the fault as informed.

40. A fault monitoring and controlling method for a data processing system according to claim 39, wherein said recovery processing procedure generated by said recovery processing procedure generating means includes a sending step for causing said remotely located supervision and control system to send out said recover processing procedure when a maintenance person loads a command requesting for reference to the recovery processing procedure into said manipulating means of said computer system, and a display control step for displaying the received recovery processing procedure on a console/display unit associated with the monitor and control apparatus which has received said recovery processing procedure.

41. A fault monitoring and controlling method for a data processing system according to claim 40, wherein a console/display unit of said computer system and a console/display unit of said remotely located supervision and control system are in data communication with each other.

42. A fault monitoring and controlling method for a data processing system according to claim 37, wherein a control means performs an execution control step for executing an instruction for generating said fault occurrence signal when a predetermined monitor program operating on said monitor and control apparatus and designed to constantly inspect the state of said hardware for abnormalities in the state of said hardware.

43. A fault monitoring and controlling method for a data processing system according to claim 37, wherein a control means performs an execution control for executing an instruction for generating said fault occurrence signal when a hardware monitoring mechanism operating on said monitor and control apparatus detects an abnormality in an operating state of hardware.

44. A fault monitoring and controlling method for a data processing system according to claim 38, wherein said hardware fault read-out step includes an address control step for assigning addresses to individual processing units of said central processing unit and a reception control step for receiving hardware states held by the addressed individual processing units through a dedicated data line.

45. A fault monitoring and controlling method for a data processing system according to claim 38, wherein said hardware fault read-out step includes a read control step which is capable of reading out data from a specific area of said main storage which can not be accessed by said operating system.

46. A fault monitoring and controlling method for a data processing system according to claim 44, wherein said hardware fault read-out control step includes a control step for sending storage area address to said main storage for thereby obtaining corresponding data.

47. A fault monitoring and controlling method for a data processing system according to claim 45, further comprising a storage control step for storing in predetermined storage means a hardware state information read out through said hardware fault read-out control step.

48. A fault monitoring and controlling method for a data processing system according to claim 38, wherein said sending control step includes an edition and sending control step for editing fault information to be sent out when said fault information is transmitted to said remotely located supervision and control system at said send control step.

49. A fault monitoring and controlling method for a data processing system according to claim 47, wherein said sending control step includes a control step for editing the contents of said predetermined storage means when hardware information is edited and a data reducing step for replacing a succession of similar data which appears when editing the contents of said main storage with data representing said data succession.

50. A fault monitoring and controlling method for a data processing system according to claim 39, wherein at said fault precedent storing step, phenomenon and causes of fault occurrence and remedying record of the fault are stored.

51. A fault monitoring and controlling method for a data processing system according to claim 39, further including a control step for storing the fault for which no corresponding precedent is found as a result of collation performed at said collating step as a new fault record to serve as a precedent in said fault precedent storage means.

52. A fault monitoring and controlling method for a data processing system according to claim 39, wherein when the corresponding precedent can not be found as a result of collation performed at said collating step, a control step is provided for displaying an absence of the corresponding precedent on a console/display unit when a maintenance person inputs a command requesting reference to the recovery processing procedure through a console/display unit of said computer system, and wherein a processing step is provided for displaying the contents of first storage means and predetermined storage means on said console/display unit.

53. A fault monitoring and controlling method for a data processing system according to claim 39, further including a control step for storing the fault for which no corresponding precedent is found as a result of collation performed at said collating step and for which a cause, phenomenon and recovery procedure are later found in said fault precedent storage means by associating the cause of the fault and the recovery procedure with the phenomenon of said fault.

54. A fault monitoring and controlling method for a data processing system according to claim 39, further including a processing step for displaying the fault information obtained from first storage means and predetermined storage means on a display output unit of said remotely located supervision and control system when no corresponding precedent is found as a result of the collation performed at said collation step.

55. A fault monitoring and controlling method for a data processing system which comprises:

a computer system including a main storage, a central processing unit and a manipulating means equipped with functions for operation and maintenance of said central processing unit and an operation system, a monitor and control apparatus connected to said computer system for performing a fault monitoring and controlling operation for said computer systems; and a single remotely located supervision and control system for providing information to said monitor and control apparatus for supervising and controlling from a remote site said computer system;

wherein when a fault takes place in said computer system and when fault information of the occurrence of the fault is received by said remotely located supervision and control system, said fault information is collated with contents of a fault precedent storage means incorporated in said remotely located supervision and control system, and when a precedent coinciding with said fault is present, recovery processing procedure for removing the fault from said computer system is generated and transferred to said monitor and control apparatus provided in association with said computer system suffering from the fault, said monitor and control apparatus receiving said recovery processing procedure for restarting said computer system in accordance with said recovery processing procedure.

56. A fault monitoring and controlling system for a data processing system, comprising:

a computer system including a main storage, a central processing unit and a manipulating means equipped with functions for operation and maintenance of said central processing unit and an operation system, a monitor and control apparatus connected to said computer system for performing a fault monitoring and controlling operation for said computer systems; and a single remotely located supervision and control system for providing information to said monitor and control apparatus for supervising and controlling said computer system;

wherein each of said monitor and control apparatus comprises:

first storage means for storing a predetermined number of message data of the operation system of the computer system or command data inputted from said manipulating means;

second storage means for storing message data for detecting abnormal states;

comparison means for comparing message data of said operation system with the contents of said second storage means;

fault decision means for deciding whether a fault has occurred on the basis of said comparison; and report control means for automatically reporting the occurrence of the fault to said remotely located supervision and control system; and wherein said remotely located supervision and control system comprises:

fault precedent storage means for storing precedent fault information to serve as a precedent when said remotely located supervision and control system receives fault occurrence information from said monitor and control apparatus;

collation means for collating said fault occurrence information with the contents of said fault precedent storage means; and recovery processing procedure generating means for generating a recovery processing procedure for remedying a fault when said collation performed by said collation means shows the presence of a precedent which coincides with the fault.

57. A monitoring and controlling system comprising:

a first computer system including a service processor;

a monitor and control apparatus for monitoring and controlling the operation of said first computer system;

wherein said monitor and control apparatus includes:

first means for receiving a message data from an operating system and said service processor and displaying the message data on a console unit;

second means for sending a command data inputted from said console unit to said operating system and said service processor;

memory means for storing a plurality of said message data received by said first means and a plurality of command data inputted from said console unit;

third means for detecting an occurrence of a software fault in said first computer system by comparing said received message data with predetermined fault message data;

fourth means for receiving hardware fault signals from said first computer system and gathering hardware fault information related to the received hardware fault signals from said first computer system;

fifth means responsive to detection of the software fault by said third means, for informing a second computer system at a remotely located monitoring center of the generation of the software fault; and sixth means for sending said plurality of message data and said plurality of command data from said memory means to said second computer system and responsive to receipt of the hardware fault signal by said fourth means for informing said computer system of the occurrence of a hardware fault within the first computer system and for sending the hardware fault information gathered by said fourth means to said second computer system.

* * * * *

UNITED STATES PATENT AND TRADEMARK OFFICE
CERTIFICATE OF CORRECTION

PATENT NO. : 5,237,677

DATED : August 17, 1993

INVENTOR(S) : Toshio Hirosawa, et al.

It is certified that error appears in the above-identified patent and that said Letters Patent is hereby corrected as shown below:

Claim 11, column 26, line 28, delete "or" and substitute therefor --for--.

Claim 40, column 31, line 17, delete "recover" and substitute therefor --recovery--.

Signed and Sealed this

Nineteenth Day of April, 1994

Attest:

BRUCE LEHMAN

Attesting Officer

Commissioner of Patents and Trademarks